(12) United States Patent  
Kotchou et al.

(10) Patent No.: US 8,913,127 B2  
(45) Date of Patent: Dec. 16, 2014

(54) CALIBRATION OF IMAGING DEVICE FOR BIOLOGICAL/CHEMICAL SAMPLES

(75) Inventors: Keith Kotchou, Walnut Creek, CA (US); Christof Schultz, Orinda, CA (US); Kevin McDonald, Novato, CA (US); Neeraj Bhatt, Fremont, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 1017 days.

(21) Appl. No.: 12/791,795

(22) Filed: Jun. 1, 2010

(65) Prior Publication Data

US 2011/0134238 A1  Jun. 9, 2011

Related U.S. Application Data

(60) Provisional application No. 61/183,022, filed on Jun. 1, 2009.

(51) Int. Cl.  
*H04N 7/18* (2006.01)  
*G06T 7/00* (2006.01)

(52) U.S. Cl.  
CPC ..... *G06T 7/0018* (2013.01); *G06T 2207/30024* (2013.01); *G06T 2207/30208* (2013.01)  
USPC ....................................... 348/140

(58) Field of Classification Search  
USPC ................... 348/79, 140; 382/133  
See application file for complete search history.

(56) References Cited

U.S. PATENT DOCUMENTS

| | | | |
|---|---|---|---|
| 4,314,151 A | 2/1982 | Suzuki et al. | |
| 4,752,831 A | 6/1988 | Biber et al. | |
| 5,317,351 A * | 5/1994 | Takahara et al. | 396/81 |
| 5,799,773 A * | 9/1998 | Heffelfinger et al. | 204/461 |
| 5,854,711 A * | 12/1998 | Kaneda | 359/697 |
| 6,476,979 B1 * | 11/2002 | Schaack | 359/738 |
| 7,301,560 B2 | 11/2007 | Noma et al. | |

(Continued)

FOREIGN PATENT DOCUMENTS

| | | |
|---|---|---|
| JP | 2000-081560 | 3/2000 |
| JP | 2004-258495 | 9/2004 |

(Continued)

OTHER PUBLICATIONS

"A Fully Automated Calibration Method for an Optical See-Through Head-Mounted Operating Microscope With Variable Zoom and Focus" to Figl in IEEE Transactions on Medical Imaging, vol. 24, No. 11, Nov. 2005.*

(Continued)

*Primary Examiner* — Mehrdad Dastouri  
*Assistant Examiner* — Mohammed Rahaman  
(74) *Attorney, Agent, or Firm* — Kilpatrick Townsend & Stockton LLP

(57) ABSTRACT

Methods, apparatuses, and systems for imaging biological/chemical samples are provided. A calibrated imaging system can allow a user to obtain an optimal focus setting (position) for any effective distance (e.g. a zoom setting). The optimal focus can be determined from a functional approximation that defines a relationship between effective distance and focus setting. A user can input a size, and an imaging system can determine the appropriate effective distance and focus. An imaging system can also determine a size based on any effective distance. A flat-field correction can also be determined for any effective distance or size.

29 Claims, 14 Drawing Sheets

(56) References Cited

U.S. PATENT DOCUMENTS

| | | | |
|---|---|---|---|
| 7,907,271 B2* | 3/2011 | Christiansen et al. | 356/243.1 |
| 2002/0186875 A1* | 12/2002 | Burmer et al. | 382/133 |
| 2004/0036775 A1 | 2/2004 | Watson et al. | |
| 2006/0204072 A1* | 9/2006 | Wetzel et al. | 382/133 |
| 2007/0057211 A1 | 3/2007 | Bahlman et al. | |
| 2007/0211243 A1* | 9/2007 | Laroche et al. | 356/243.1 |
| 2007/0229665 A1* | 10/2007 | Tobiason et al. | 348/187 |
| 2009/0147355 A1* | 6/2009 | Jennings | 359/391 |
| 2010/0025566 A1* | 2/2010 | Hargrove et al. | 250/201.2 |

FOREIGN PATENT DOCUMENTS

| | | |
|---|---|---|
| JP | 2006-259377 | 9/2006 |
| JP | 2006-345388 | 12/2006 |
| WO | WO 03/003000 A1 | 1/2003 |

OTHER PUBLICATIONS

"Design and evaluation of a system for microscope-assisted guided interventions (MAGI)," to Edwards in IEEE Trans. Med. Imag., vol. 19, No. 11, pp. 1082-1093, Nov. 2000.*

Figl et al. "A Fully Automated Calibration Method for an Optical See-Through Head-Mounted Operating Microscope With Variable Zoom and Focus"; IEEE Transactions on Medical Imaging, vol. 24, No. 11, Nov. 2005.*

International Search Report and Written Opinion from PCT/US2010/036930, dated Aug. 2, 2010 (10 pages).

Japanese Office Action (English Translation) mailed Dec. 3, 2013 in JP Application No. 2012-513360, 4 pages.

Chinese Office Action (English Translation) mailed Dec. 20, 2013 in CN Application No. 201080024892.9, 8 pages.

* cited by examiner

CALIBRATION OF IMAGING DEVICE FOR BIOLOGICAL/CHEMICAL SAMPLES

CROSS-REFERENCES TO RELATED APPLICATIONS

The present application claims the benefit of priority under 35 U.S.C. §119 from U.S. Provisional Patent Application Ser. No. 61/184,022, entitled "Calibration of Imaging Device for Biological/Chemical Samples," filed on Jun. 1, 2009, the disclosure of which is hereby incorporated by reference in its entirety for all purposes.

BACKGROUND

The present invention relates generally to imaging of biological/chemical samples, and more particularly to calibrating an imaging system to focus on the samples.

Biological and chemical samples may be imaged for any number of reasons. For example, the images may be used to identify a certain cell structure, ranging from malignant tumors to specific chromosomes in a DNA sequence. Typically, gels and blots containing, e.g., polyacrylamide or agarose, are used to hold the molecules of a sample. The sample may be marked with fluorescent dyes that can help in the identification and/or characterization of the molecules in the image, which can include a location of a molecule. For example, a sample may be organized into different sections based on properties of the molecules in the sample, e.g., as a result of electrophoresis. Thus, a location of the specific molecule and the color and intensity of light that a molecule reflects or emits can be used in the identification and characterization of a sample. However, it is often difficult to obtain a good image of a sample, which can reduce the accuracy of measurements and characterization of the molecules.

Therefore, it is desirable to provide new methods and systems that allow for accurate imaging and that are relatively easy to implement.

BRIEF SUMMARY

Embodiments of the invention include methods, apparatuses, and systems for imaging biological/chemical samples. A calibrated imaging system can allow a user to obtain an optimal focus setting (position) for any effective distance (e.g. a zoom setting). Thus, a user can obtain an accurate and reproducible image for any effective distance, which can in turn allow any desired image size, thereby also providing greater accuracy since the sample can be imaged to a greater resolution. In one embodiment, the optimal focus is determined from a functional approximation that defines a relationship between effective distance and focus setting. Also, a user can input a size, and an imaging system can determine the appropriate effective distance and focus. An imaging system can also determine a size based on any effective distance. An accurate flat field correction can also be determined.

According to one embodiment, a method for calibrating an imaging system for imaging biological or chemical samples is provided. A plurality of initial effective distances from an optical component of the imaging system to a sample location are used. For each initial effective distance, an optimal focus setting of the optical component is identified. Means (e.g. data and/or software code) for the imaging system to determine a first functional approximation that is derived from the optimal focus settings at the initial effective distances is stored in at least one computer readable medium that is adapted to be communicably coupled with the imaging system. The first functional approximation can be used to calculate an optimal focus setting for a new effective distance that is not one of the initial effective distances.

According to another embodiment, an imaging system for imaging biological or chemical samples is provided. The imaging system includes an optical component having a plurality of focus settings; a means of changing an effective distance from the optical component to a biological or chemical sample, a processor configured to map any effective distance to an optimal focus setting; and a controller configured to set the optical component to have the optimal focus setting that maps to a selected effective distance.

According to another embodiment, a method of determining a size of a biological or chemical sample using an imaging system is provided. An input effective distance between an optical component of the imaging system and the sample is received. The imaging system obtains a mapping of any effective distance to a corresponding size. The imaging system determines the size that corresponds to the input effective distance based on the mapping. The size can then be provided to the user.

Other embodiments of the invention are directed to systems and computer readable media associated with methods described herein.

As used herein, the term "optimal" can refer to any setting that is chosen for having better properties than another setting. The setting does not have to the best possible setting, but is chosen over another setting based on some criteria. In one embodiment, the optimal setting is determined with an optimization method to within a desired accuracy.

As used herein, the term "effective distance" refers to actual distance or a simulated distance from an optical component (e.g. a lens) to a sample location, where an actual sample or a calibration target may be placed. The simulated distance may be a result of magnification (e.g. an optical zoom of a lens).

As used herein, the term "functional approximation" refers to any function(s) that can receive an input parameter and provide a corresponding parameter. Examples of parameters include a size of a sample and a setting of the imaging system. In some embodiments, an input parameter provided by a user can be taken as is, with a unique corresponding parameter being identified. In other embodiments, the value of an input parameter is shifted to a new value and then the corresponding setting is identified. Here, different input parameters can correspond to a same setting In such embodiments, the new parameter can be almost the same as the input parameter, and thus little accuracy may be lost. This embodiment can be when the functional approximation is formulated as a list of effective distances with corresponding focus settings, which can be derived from a smaller list of initial effective distances for which optimal focus settings have been determined.

A better understanding of the nature and advantages of the present invention may be gained with reference to the following detailed description and the accompanying drawings.

DETAILED DESCRIPTION

Biological and chemical samples often have a low contrast; therefore, an auto-focus camera will not work well. Accordingly, properties (e.g. location, color, intensity) of the light emitted or reflected from a sample can be hard to determine. Even if one were to perform the focusing manually, a user might not set the focus accurately, and the focus might change from user to user and from one sample to another, thereby making the results not reproducible and inaccurate. These measurement errors can make it difficult to identify and/or characterize certain molecules in a sample. One could require certain effective distances whose optimal focus is known, but then the sample might be larger than the available image, or too small to determine the properties accurately.

Embodiments can calibrate and provide systems that provide accurate images of biological/chemical samples. A calibrated imaging system can allow a user to obtain an optimal focus setting (position) for any effective distance (e.g. a zoom setting). Thus, a user can obtain an accurate and reproducible image for any effective distance, which can in turn allow any desired image size, thereby also providing greater accuracy since the sample can be imaged to a greater resolution. In one embodiment, the optimal focus is determined from a functional approximation that defines a relationship between effective distance and focus setting. Also, a user can input a size, and an imaging system can determine the appropriate effective distance and focus. An imaging system can also determine a size based on any effective distance. An accurate flat field correction can also be determined.

The calibration can use specific targets at the location of a sample, which have higher contrast than the biological/chemical samples. These calibration targets can also have features that are of known location or size. Such calibration targets can be used to calibrate the imaging system to identify a focus of a lens (or other optical component) of the camera, a zoom setting (or other effective distance) of the camera, a size of a sample, and a flat field correction for images of a sample. Some embodiments can provide a wizard to walk a user through the calibration. One embodiment can perform the calibration from a single activation once a calibration target has been put into a sample location.

I. System

Figure 1:
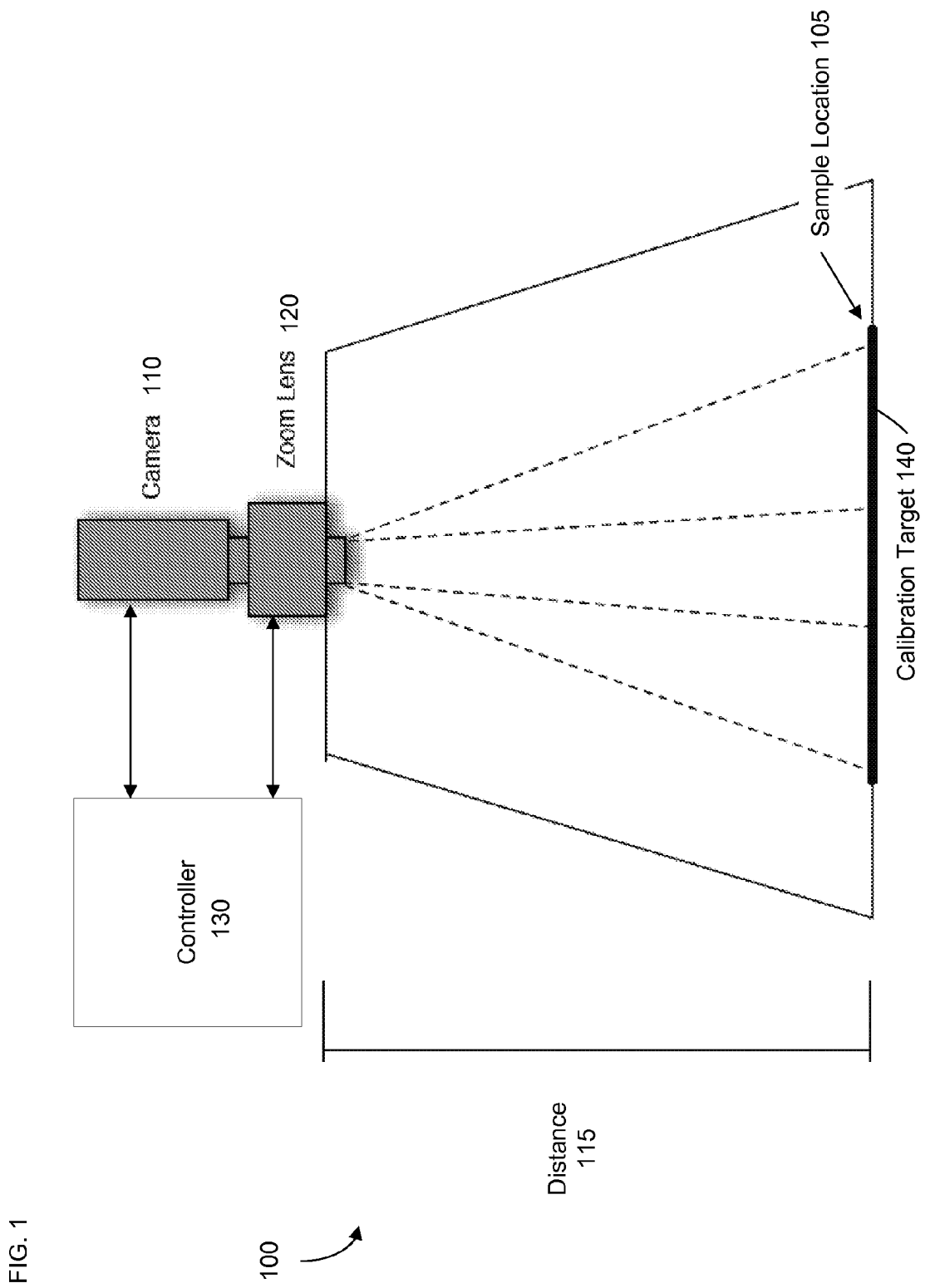
FIG. 1 shows an imaging system for imaging chemical or biological samples according to embodiments of the present invention.

FIG. 1 shows an imaging system 100 for imaging chemical or biological samples according to embodiments of the present invention. A camera 110 is used to image a sample when it is placed at a sample location 105. In one embodiment, camera 110 can include a two dimensional array detector, such as a charge-coupled device (CCD) or complementary metal-oxide-semiconductor (CMOS) detector, for imaging the sample or a calibration target 140, which can also be placed at sample location 105. Calibration target 140 can be used to determine settings of a lens 120 and can have particular features (e.g. a pattern) for the calibration.

In one embodiment, a light source is provided underneath the sample location to provide illumination of the sample. In another embodiment, the sample emits light (e.g. from a dye) so that a light source is not needed. The light is transmitted from the sample through lens 120 to camera 110. Imaging system 100 may be surrounded by an enclosure so that light other than from the light source is not received by camera 110.

In one embodiment, a distance 115 from lens 120 to sample location 105 can be changed in order to provide greater resolution of a sample. For example, if the sample takes up most of the image taken, then more pixels (and thus more accuracy) can be dedicated to imaging the sample. However, one does not want to cut off part of the sample. In one embodiment, the sample may be on a platform that may be elevated using gears, a pulley system, blocks, or other mechanism as would be known to one skilled in the art. Camera 110 also may be moved, e.g., along a mechanical system where positions can be quantified. Other optical components (e.g. mirrors) besides a lens may be used to focus on the sample.

In another embodiment, a distance 115 from lens 120 to sample location 105 can be fixed, and lens 120 can be a zoom lens. Zoom lens 120 can be used to change the effective distance to sample location 105. The effective distance may correspond to a zoom setting, which makes the sample appear larger (thus closer) than it really is. The term "effective" distance can refer to an actual distance or the simulated distance resulting from magnification. Although much of the following discussion related to zoom settings, one skilled in the art will appreciate the applicability to changing an actual distance.

A controller 130 can be used to control the camera 110, and camera 110 can provide information to controller 130. For example, controller 130 can send commands and supplemental information to camera 130. Commands can include open/close shutter, settings for the gain used in the imaging electronics, how a CCD is operating (e g binning), as well as other commands. In various embodiments, camera 110 can send to controller 130 status information (e.g. settings of camera), information about what the camera is doing, and images.

Controller 130 can be also used to control lens 120, which may be done also through the connection with the camera 110. For example, controller 130 can send commands to control zoom, focus, and iris settings. Lens 120 can also send information to controller 130, such as status information (e.g. a voltage describing a state of the lens). A voltage can correspond to a position of a motor that is used to change a lens setting. Thus, a particular voltage can correspond to a particular setting. In one embodiment, respective voltages (digital or analog) for each of zoom, focus, and iris are sent from lens 120 to the controller. To obtain a particular setting, controller 130 can send commands to move a motor, receive the corresponding voltage as it changes, and use the voltage to determine when to provide a stop command when the desired setting (voltage) is obtained. In one embodiment, an analog-to-digital converter receives an analog voltage from the motor and converts it to a digital voltage value for processing by controller 130. The converter can be in lens 120 or in controller 130. As part of a calibration, controller 130 can obtain the minimum and maximum voltages for each motor. These voltages can also be used so the controller does not break the motor by trying to make it operate beyond its workable range.

Controller 130 can process images and may also move a mechanical apparatus of the sample when distance 115 is variable. In one embodiment, the controller is a standard computer. In another embodiment, the controller may be a specialized device with hardwired circuitry, e.g.

an application specific integrated circuit (ASIC) or a device with some programmability, such as a field programmable gate array (FPGA).

As a sample may be difficult to image, a calibration of the camera and/or lens settings can be performed. In one embodiment, calibration target 140 is a checkerboard pattern. In various embodiments, calibration target 140 can be used to determine a focus setting for a particular effective distance, used to determine a size for a particular effective distance, or an effective distance for a particular size. Other targets may be used for flat fielding corrections.

II. Focusing

If the effective distance to the sample location changes, the focus of setting of lens 120 will need to change. One can manually determine the focus, but this is time consuming and is not reproducible, so measurements may be different each time. Alternatively, one can use predetermined effective distances with specific focus settings for these effective distances. But, then the imaging system is limited to the predetermined effective distances. In such cases, a predetermined effective distance might cause the sample to be a relatively small part of the image (and thus have relatively low resolution of the sample), or the sample could be larger than the maximum image size. Accordingly, embodiments can provide for accurate and reproducible focus settings for any effective distance.

A. Calibrating Imaging System to Use any Effective Distance

In some embodiments, a calibration process can measure an optimal focus setting for initial effective distances. These measured optimal focus settings can be used to determine optimal focus settings for other effective distances. In one embodiment, the process of calibration is automated, with a user simply setting up a calibration target and initiating the calibration process. In another embodiment, a user can manually perform certain steps. In one aspect, the automated method can provide for greater reproducibility of images across samples.

Figure 2:
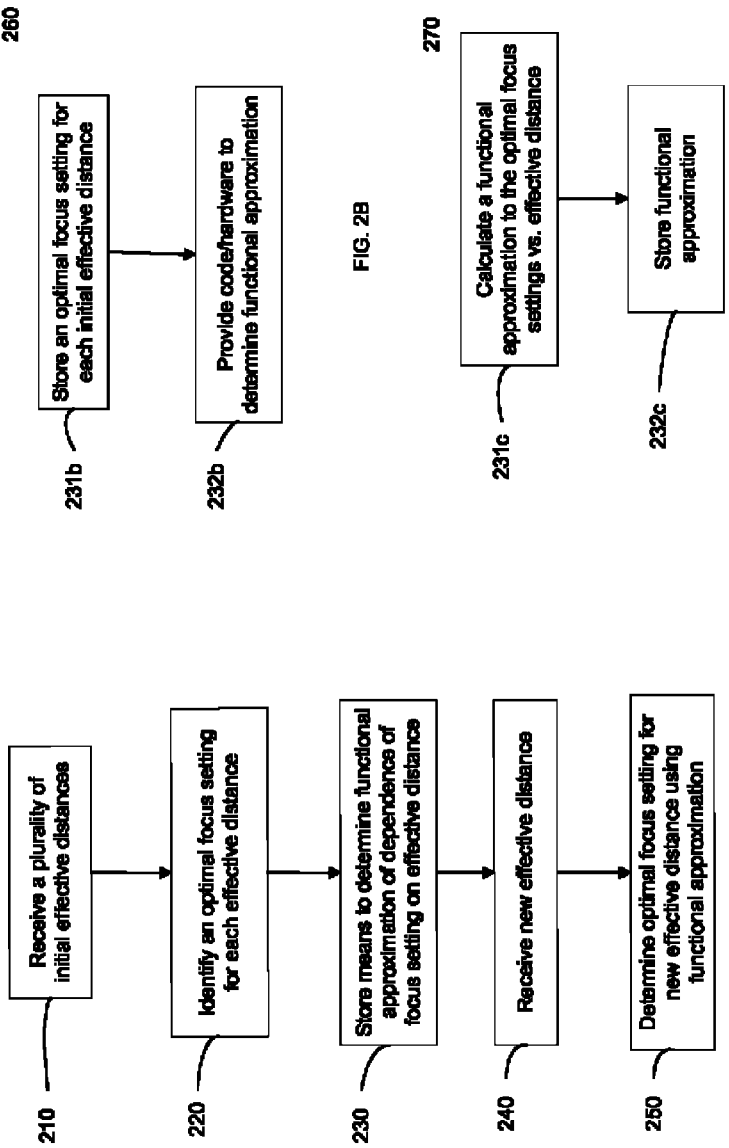
FIG. 2A is a flowchart illustrating a method for calibrating an imaging system for imaging biological or chemical samples according to embodiments of the present invention.
FIGS. 2B and 2C shows methods of storing means for determining a functional approximation to the relationship of an effective distance to optimal focus setting according to embodiments of the present invention.

FIG. 2A is a flowchart illustrating a method for calibrating an imaging system for imaging biological or chemical samples according to embodiments of the present invention. The method uses a calibration target that has a higher contrast than the biological or chemical samples that are to be imaged.

In step 210, a plurality of initial effective distances is received. The effective distances are from a sample location (e.g. sample location 105) to an optical component (e.g. lens 120) of the imaging system. In one embodiment, the focus algorithm selects N effective distances (e.g.

zoom settings in the camera's zoom range). The N zoom settings may be equally spaced along the entire zoom range.

In step 220, an optimal focus setting of the optical component is identified for each effective distance. In one embodiment, a calibration target is placed at the sample location and used to determine the optimal focus setting. In one aspect, the optimal focus setting can be determined at N zoom settings (e.g. 11) including the minimum and maximum settings.

In step 230, means to determine a functional approximation of the dependence of the optimal focus setting on an effective distance is stored in a computer readable medium adapted to be communicably coupled with the imaging system. The computer readable medium may be a permanent part of the imaging system or may be removable. When communicably coupled, the means allows the imaging system to determine an optimal focus setting for any effective distance. FIGS. 2B and 2C below provide examples of means for determining the functional approximation. Examples of computer readable media include a random access memory (RAM), flash memory including a flash drive, compact disc (CD), Digital Versatile Disc (DVD), or any other kind of memory storage device.

In step 240, a new effective distance, which is not one of the initial effective distances, is received. In one embodiment, a new effective distance can be received from a user to image a biological/chemical sample. The user might select the effective distance by changing the zoom setting until the sample fills approximately a sufficient portion (e.g. at least 90%) of the image. In one aspect, the sufficient portion is just along one dimension. In another aspect, the input effective distance can be estimated by a user using a non-optimal focus setting. Once the effective distance is input, the optimal focus setting can then be determined. In another embodiment, the new effective distance may be supplied by the imaging system itself, e.g., as described below for method 1000 in FIG. 10.

In step 250, an optimal focus setting for the new effective distance is determined from the functional approximation. The functional approximation can provide a mapping from any effective distance (e.g. input by the user) to obtain an optimal focus setting for that effective distance. For example, the functional approximation can be a function that receives an effective distance as an input and provides the optimal focus setting. In one embodiment, controller 130 can determine the optimal focus setting. In another embodiment, another processing device communicably coupled with controller 130 determines the optimal focus setting and provides the setting to controller 130. Controller 130 can then send a command to lens 120 to obtain the optimal focus setting.

Figure 3:
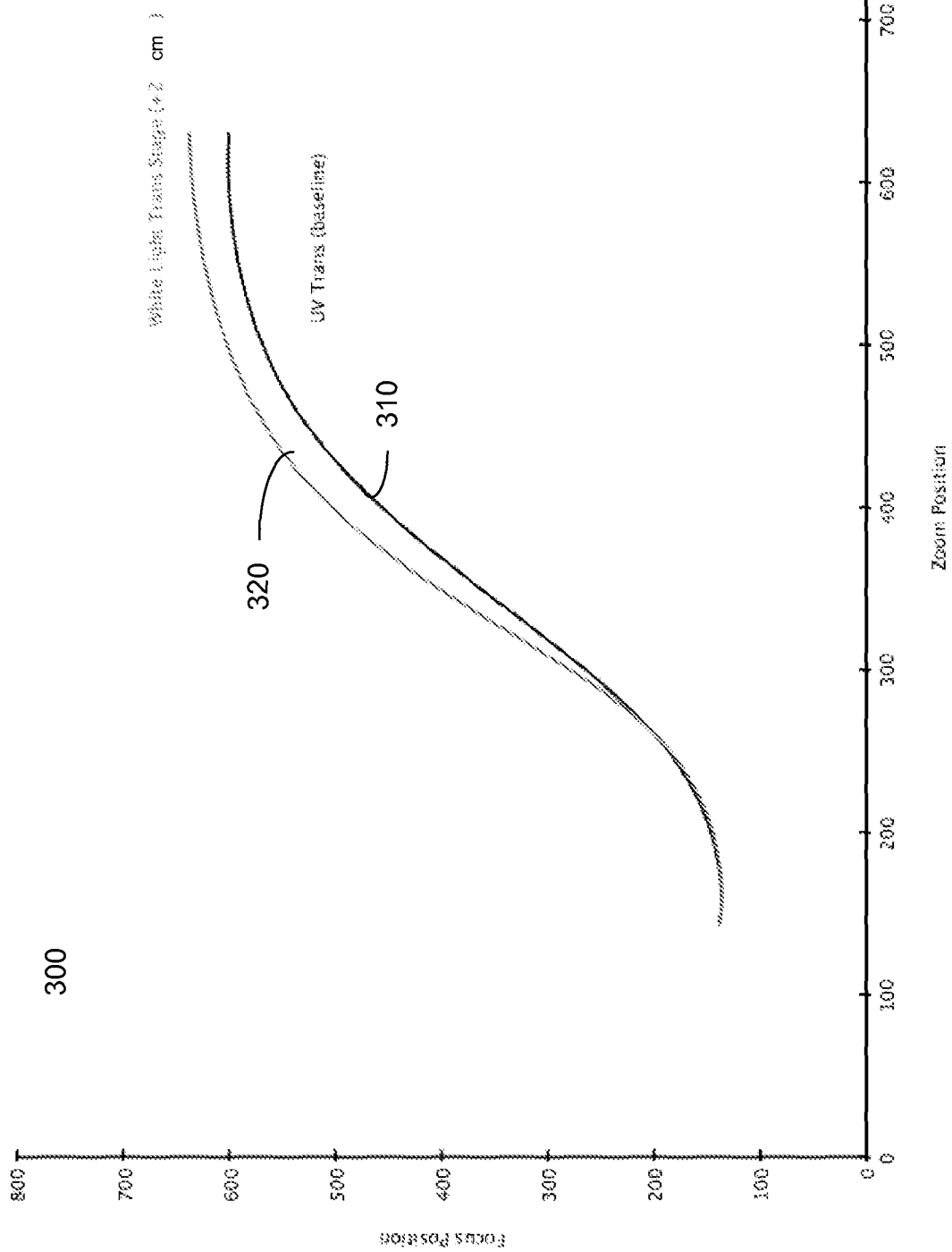
FIG. 3 shows a plot illustrating functional approximations (curves as shown) resulting from a functional fit of data points of optimal focus points at varying initial effective distances and offset corrections of such curves according to an embodiment of the present invention.

FIG. 3 shows a functional approximation 310 of effective distance (zoom position) vs. focus position according to embodiments of the present invention. As shown, functional approximation 310 is a continuous curve; however, other representations may be used. Other examples include a discontinuous function that has multiple continuous portions defined within non-overlapping segments (e.g. using finite element or finite difference) or as M data points {zoom, focus}, where M is greater than N (the number of initial effective distances). Conceptually, any zoom position can be selected and a corresponding optimal focus setting can be determined from the plot. In one embodiment, curve 310 is defined as a formula (which can have multiple components) which provides a value on the Y axis (focus position) for each value on the X axis (zoom position).

In one embodiment, curve 310 is obtained by calculating a functional fit of the N data points of the initial effective distances and the corresponding optimal focus settings. For example, a functional form may be chosen (e.g. polynomial, sigmoid, wavelets, or finite difference) with parameters that are optimized based on a fit (e.g. least squares) of the functional form to the N data points. In another embodiment, curve 310 can be determined using interpolation (e.g. linear or quadratic interpolation), with defined functional forms that are constrained to have the determined optimal focus settings at the initial effective distances. An interpolation can use data points having initial effective distances proximal (e.g. on either side of) an input effective distance. Other methods of determining any form of the functional approximation can include combinations of methods mentioned herein and other suitable methods of obtaining a functional approximation from a set of data points.

As an example, the initial zoom positions may be plotted vs. the optimal focus positions, which may be performed by the controller 130. Focus values at zoom positions between the initial zoom positions may be determined using the functional approximation. In one aspect, the accuracy of the intermediate values can be increased or decreased by using more initial data points. In another aspect, the accuracy can be increased by using more complex functions for the approximation (e.g. higher order polynomials or more wavelets).

In FIG. 3, curve 310 is shown between minimum and maximum zoom positions, which can correspond to the limits of the settings available on the lens. The functional approximation could provide focus settings for zoom settings outside of the min/max range, but such positions may not be able to be obtained with the zoom lens for which the calibration is done. Different zoom lenses can provide different min/max ranges.

The means for determining the functional approximation can take on various forms. In one embodiment, the means can provide for calculating the functional approximation on the imaging system from the N data points for the initial effective distances. In another embodiment, the functional approximation may already be calculated, and the means can just retrieve the functional approximation and input the new effective distance to determine the corresponding optimal focus setting.

FIG. 2B shows a method 260 of storing means for determining a functional approximation to the relationship of an effective distance to optimal focus setting according to embodiments of the present invention. Method 260 may be used to implement step 230 of method 200.

In step 231b, an optimal focus setting for each initial effective distance is stored in a computer readable medium adapted to be communicably coupled with the imaging system. In one embodiment, the optimal focus settings may be determined by the imaging system, and thus can be automatically stored in a permanent memory. In another embodiment, the optimal focus settings may be determined by a user and then stored on the computer readable medium. Once the medium is communicably coupled with the imaging system, the optimal focus settings can be used by the imaging system to determine the functional approximation. In one embodiment, the data points of {initial effective distance, focus setting} are stored as a table or other array.

In step 232b, code and/or hardware is provided to determine the functional approximation from the stored data points of {zoom,focus}. In one embodiment, software code is stored on permanent and/or removable computer readable media. The code may be stored on the same medium as the data points. The code can be used by a processor of the imaging system to calculate the functional approximation using the data points. Various algorithms can be used to determine the functional approximation, e.g., interpolation, least squares fit to a polynomial, etc.

In another embodiment, the imaging system can have hardware that is hardwired (e.g. an ASIC) to use one or more algorithms (e.g. as mentioned herein) to calculate the functional approximation based on the data points. In yet another embodiment, an imaging system can use both software and hardwired hardware. For example, the software code can be loaded as configuration data of an FPGA that contains ASIC parts. Similarly, a microprocessor can contain certain parts that are hardwired to perform certain instructions.

FIG. 2C shows a method 270 of storing means for determining a functional approximation to the relationship of an effective distance to optimal focus setting according to embodiments of the present invention. Method 270 may be used to implement step 230 of method 200.

In step 231c, a functional approximation to the optimal focus settings vs. effective distance is calculated. The functional approximation may be calculated as described above. In one embodiment, the calculation can be performed by a computer that is not coupled with the imaging system. In another embodiment, the calculation can be performed by the imaging system.

The functional form can be represented in multiple ways. In one embodiment, the functional approximation can be stored as a series of data points {zoom,focus}. These data points are more numerous than the initial effective distances. In fact, in one embodiment, the number of data points can be equal to the number of possible settings of a zoom lens. These data points can also be used as a basis for the determination of another functional approximation (e.g. as done in step 232b). In another embodiment, the functional approximation can be stored as a set of parameters that define a function. For example, the coefficients of one or more polynomials (or other functions) can be stored. When using interpolation or finite elements, there can be multiple polynomials for different parts of the functional approximation.

In step 232c, the functional approximation is stored in a computer readable medium adapted to be communicably coupled with the imaging system. The imaging system can have program code and/or hardwire hardware that identifies and uses (e.g. in step 250 of method 200) the functional approximation. The program code can be stored in the same computer readable medium or in another computer readable medium, which may be a permanent part of the imaging system or be removable.

FIG. 3 also shows an offset functional approximation 320 that can account for a shift in the sample location. In some embodiments, the sample may be moved from the platform by a fixed distance (offset). For example, systems can have different heights because of different illumination plates, which may provide a filter between a light source and the sample, where the light source is underneath the sample. In one example, the filter may change the spectrum of the light source to a desired spectrum. In these embodiments, the calculation of a focus setting for the new effective distance includes shifting the functional fit based on an offset that results from shifting the sample by a fixed distance.

In such circumstances, one does not want to redo the entire calibration process. Accordingly, the offset functional approximation 320 can be determined from the functional approximation 310. In one embodiment, only one new data point is taken at the smallest effective distance (i.e. maximum zoom). The largest effective distance (minimum zoom setting) is taken to have the same optimal focus setting as the curve 310. The other focus settings are shifted based on a percentage of the particular zoom setting with respect to the entire available range. For example, if the zoom has a range from 150 mm to 650 mm (a range of 500 mm), a zoom position of 600 mm would have 90% of the change at 650 mm. Thus, if the change at 650 mm is from 570 to 620, then the focus position at 600 would be 615. In other embodiments, a data point at the largest effective distance can also be calculated. In one embodiment, a ratio of optimal focus settings being preserved, e.g., a ratio including a zoom setting relative to the shifted focus settings at the minimum and maximum effective distances.

Functional approximation 320 (shown as a continuous curve) can provide a focus position at any arbitrary zoom position when the sample is offset from an initial position. This offset method can also be applied to embodiments that move the actual distance of the sample. In these embodiments, each of the initial distances would be shifted, but only the optimal focus setting at the shift for the closest distance needs to be determined. The other shifted focus settings can be determined as mentioned above.

B. Finding Optimal Focus Setting

The determination of the optimal focus setting for a particular initial effective size can be determined manually, or automatically. If done automatically with a computer, the imaging system or another computing device may be used. In one embodiment, the automatic determination of an optimal focus setting for a particular effective distance uses an optimization method for determining an extrema (i.e. a minimum or maximum) of a focus contrast value. To obtain more accurate focus settings, a calibration target (e.g. 140) can be composed of one or more high contrast elements. A high contrast element can be placed such that there is at least one high contrast element always in the image. In one embodiment, a high contrast element is an edge between a two object of different color, e.g., a black object and a grey object.

Figure 4:
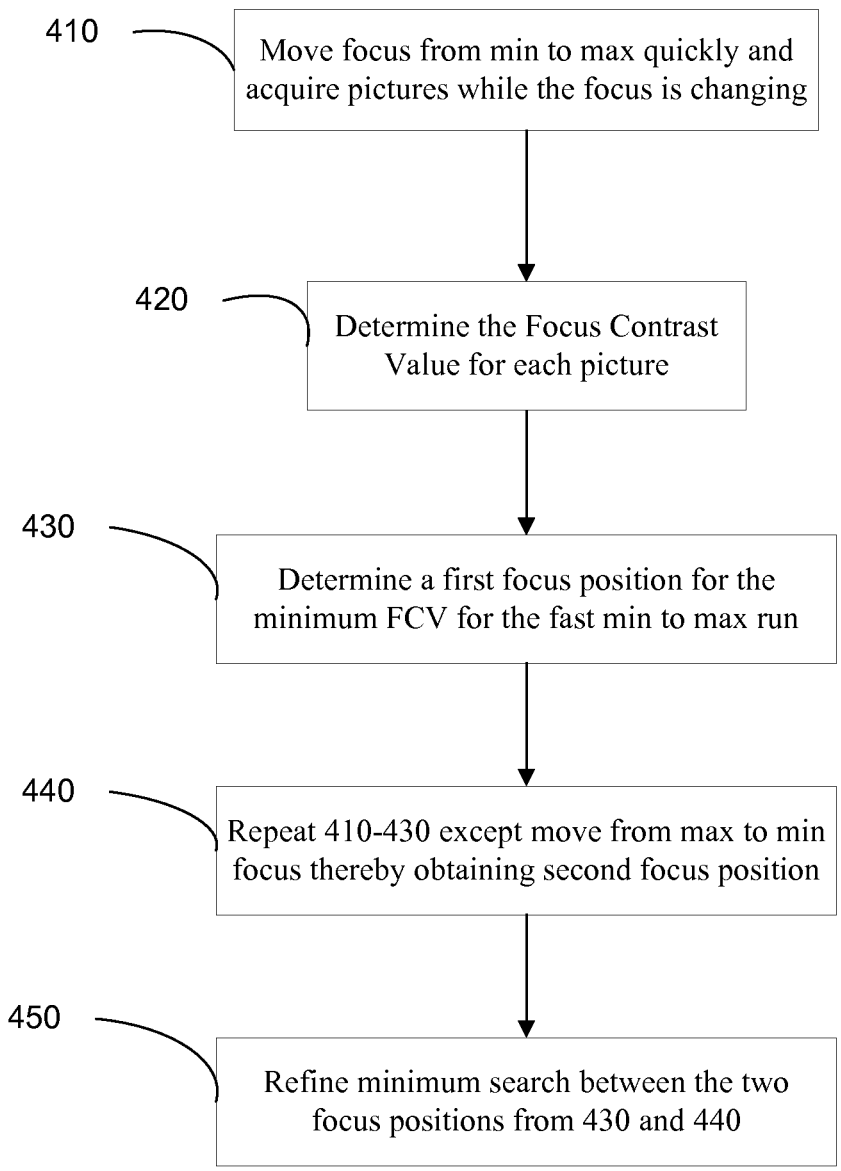
FIG. 4 is a flowchart of a method for determining an optimal focus at a particular effective distance setting according to embodiments of the present invention.

FIG. 4 is a flowchart of a method 400 for determining an optimal focus at a particular effective distance setting according to embodiments of the present invention. In one aspect, an optimal focus position of a lens is determined by acquiring images across a range of focus settings and calculating a focus contrast value (FCV) for each image, e.g. using a pixel value histogram. The focus position with a smallest (or largest depending on how FCV is defined) can be used as the optimal focus position for the particular zoom setting. The discussion below is directed to when the FCV is smallest, but can easily be applied to when the FCV is the largest.

Method 400 is performed at a fixed effective distance. For example, the lens is zoomed to a specific position. In one embodiment, the iris of the lens is opened completely during the acquiring of an image. The iris being fully opened can narrow the depth of field and help in determining the best focus position. An approximate auto exposure value may also be obtained. In one aspect, auto exposure is used to make sure that the acquired image has enough dynamic range to get good separation between the black and grey pixel values. The auto exposure may be obtained, for example, by determining the shutter speed or controlling the integration time on the photosensitive detector before reading out the signal.

In step 410, the focus setting of the lens (or other optical component) is moved from a minimum value to a maximum value, with images taken at various focus positions. Images may be acquired as quickly as possible while the focus is changing. In one embodiment, the focus setting is moved relatively quickly and is not held at a particular focus position when the image is taken. In one aspect, the minimum and maximum values for the focus setting may be the smallest and largest values that the lens can achieve. In another aspect, the minimum and maximum values can simply values that are known or estimated to respectively be less than and greater than the optimal focus setting.

Figure 5:
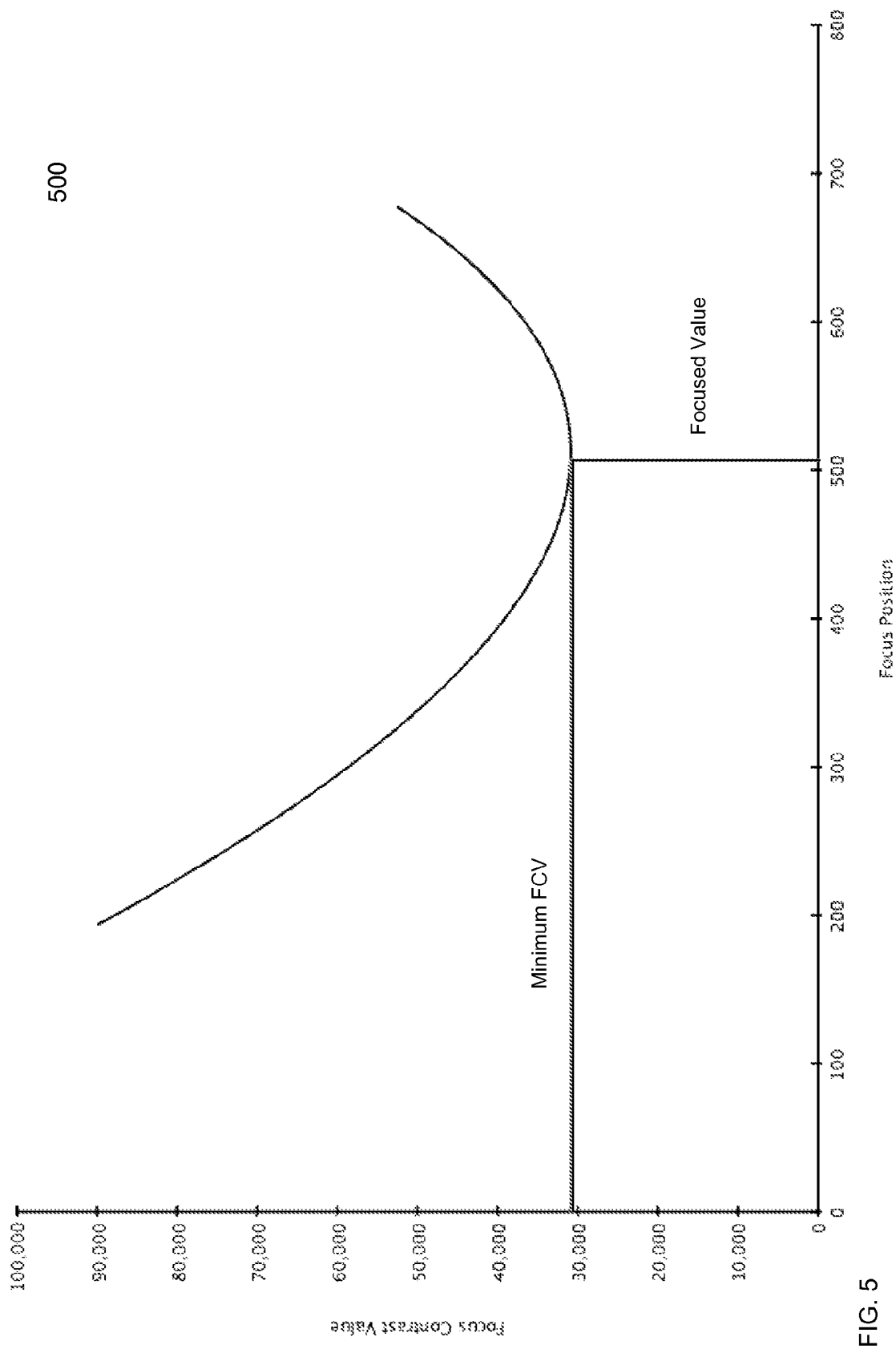
FIG. 5 shows a plot of the FCV vs. a focus setting (position) according to embodiments of the present invention.

In step 420, a focus contrast value (FCV) is determined for each image, which is taken with a different focus setting. Various types of FCVs may be used, e.g., as described herein and as known to one skilled in the art. Each data point has an FCV and a focus setting. FIG. 5 shows a plot 500 of the FCV vs. a focus setting (position) according to an embodiment of the present invention.

In step 430, a first focus position corresponding to a minimum FCV for the quick minimum to maximum sweep is determined. In one embodiment, the first focus position can correspond to the one of the images used to determine an image that has the FCV is a minimum. In another embodiment, a functional fit can be performed on multiple data points, with the fit being used to determine the minimum FCV and the corresponding focus setting. Thus, the first focus position may not be one of the focus settings used to obtain images in step 410.

In step 440, steps 410-430 are repeated except the focus setting is moved from a maximum to a minimum focus, thereby obtaining a second focus position. The first and second focus positions will typically be different. Either direction of sweep from minimum to maximum can be done first.

The first and second focus positions are rough estimates (and can provide a range) for the optimal focus setting. Since the focus was moved quickly over a relatively large range, these values may not be as accurate as desired. Thus, further refinement steps may be performed.

In step 450, the search for a minimum in the FCV is refined in the region between the first and the second focus positions determined in steps 430 and 440. The refinement can proceed in various ways.

In some embodiments, the focus setting is moved slowly between the first and the second focus positions determined in steps 430 and 440. In one aspect, this range is less than the minimum to maximum range. The focus setting is moved slowly to provide greater accuracy. A third focus position corresponding to a minimum FCV is determined for this sweep of focus settings. The focus setting is also moved slowly in the opposite direction to obtain a fourth focus position corresponding to a minimum FCV. An average of the third and fourth focus positions is calculated. This average can be taken as the optimal focus position at the specified zoom position. Alternatively, the process can proceed further with another sweep between the third and fourth focus positions, and so on, and an average of a final one of the focus settings can be used.

In other embodiments, images are taken at setting obtained while the focus is held fixed (i.e. not changing from one focus to another). The resulting values can then used to find smaller and smaller ranges for the optimal focus setting. In one embodiment, the search is binary search that split the range in half after each step. For example, the FCV of the first and second focus positions is used along with FCVs at three other focus positions of 25%, 50%, and 75% of the range. The FCVs at the first and second focus positions can be taken again, as this time the focus would be stopped at these settings. From these five points, it can be determined whether the minimum is in the first half or the second half of the range, e.g., by identifying which of the 25% point and 75% point has a lower FCV, by using an average the two pairs of points not including the center point, or by using a functional fit.

This process can repeat until a desired accuracy is achieved. In various embodiments, the desired accuracy can be based on an absolute value of the FCV, change in the FCV, and resolution of the voltage returned from the lens. For example, if the difference between the digital values for the voltages of two points is 1, then the focus setting cannot be determined to any greater detail.

In one embodiment, using a calibration target with two colors can help to provide an image that can provide a parabolic shape to the focus vs. FCV curve, as opposed to curve with multiple minimums. Other embodiments can use other optimization methods for determining the focus setting with an optimal FCV.

C. Calculation of Focus Contrast Value

In one embodiment, the FCV is determined using a calibration target that is 50% of one color and 50% of another color. For example, one color may be black (or almost black) and the other color white (or almost white). A checkerboard pattern mentioned above may be used if the resulting image is centered properly. If the colors are black and white, a monochromatic scale may be used to determine the color of each pixel.

Figure 6A:
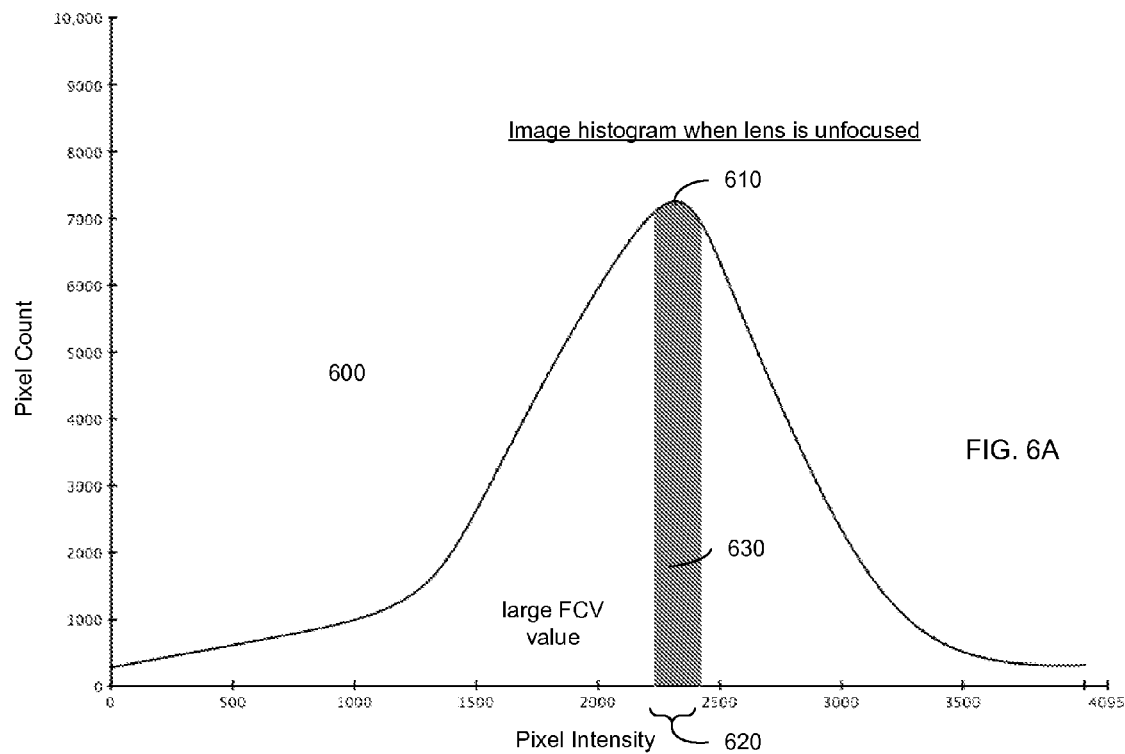
FIG. 6A shows a histogram of pixel intensity (in a monochrome scale) vs. pixel count for one or more unfocused images according to embodiments of the present invention.

FIG. 6A shows a histogram 600 of pixel intensity (in a monochrome scale) vs. pixel count for an unfocused image according to embodiments of the present invention. In some embodiments, a centroid 610 may be determined for each image. Centroid 610 can be an integer or fractional pixel intensity that corresponds to the average or median intensity. In one embodiment, centroid 610 may be determined as a weighted average of pixel intensities, where the weighting corresponds to the number of pixels with the particular intensity. In another embodiment, centroid 610 is the median pixel intensity for all of the pixels. The centroid can be different for each image.

A centroid range 620 can be centered around centroid 610, e.g. a fixed amount of pixel intensity or a percentage of the maximum intensity, such as +or −5%. In one embodiment, an area 630 under the histogram curve 600 for the centroid range 620 is taken as the FCV. This area can correspond to the number of pixels in range 620 centered around centroid 610. Thus, the FCV can be the total points inside that range. In one aspect, the range can be the same width for each image. Using the centroid range 620, the FCV for the image may be calculated for each image.

As shown in histogram 600, the centroid 610 is somewhat in the middle of the entire pixel intensity range. Thus, the most common intensity is about half intensity, or a color of grey. Since the target has only black and white, this histogram exhibits the characteristics of an unfocused image.

Figure 6B:
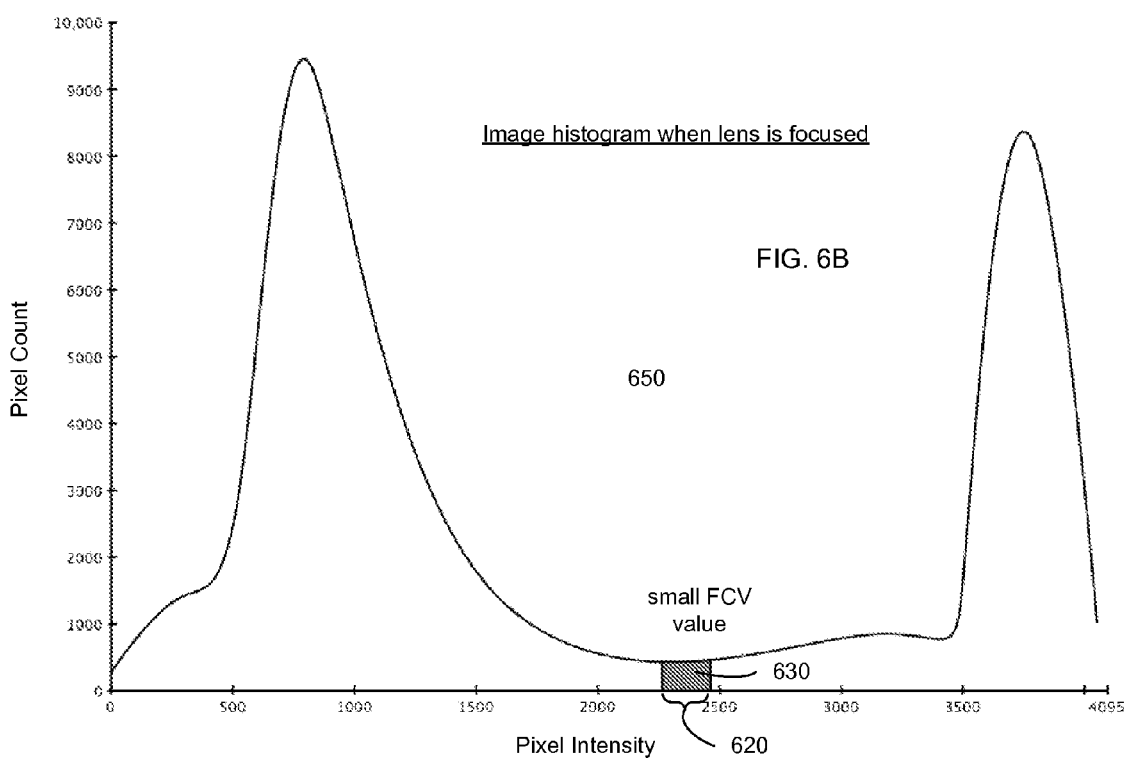
FIG. 6B shows a histogram of pixel intensity (in a monochrome scale) vs. pixel count for one or more focused images according to embodiments of the present invention.

FIG. 6B shows a histogram 650 of pixel intensity (in a monochrome scale) vs. pixel count for one or more focused images according to embodiments of the present invention. As one can see, the amount of area 630 under the histogram curve 650 for the centroid range 620 is much smaller than for the histogram curve 600. This is a result of greater separation of the two colors, and thus better contrast resolution and focus.

In another embodiment, the separation of pixel intensity of the two peaks may be used as the FCV. In such embodiments, a maximum of the FCV would correspond to the optimal focus setting. Yet another embodiment could use the height of the two peaks.

III. Sizing

The section above described a mapping of effective distance to focus setting. However, the appropriate effective distance may not be easily known. Thus, some embodiments can also provide mechanisms for determining an appropriate effective distance. Certain embodiments can also provide a mechanism for determining the size of a sample, e.g., to help perform a structural analysis of the sample.

A. Mapping of Size to Effective Distance

A size algorithm can determine the image dimensions at each of the initial effective distances. In one embodiment, the number K of image pixels spanning a given target feature of known size L is determined, and the length (or other size) per image pixel can be calculated as K/L. The size per image pixel can then be multiplied by the number of pixels in the x and y axes of the image sensor to provide an overall size of the image. An imaging system can also determine a number of pixels for a certain part of an image, and then determine the size based on K/L. One skilled in the art will appreciate other methods of determining a size from a target feature of known size. The resulting sizes can be plotted vs. each effective distance, and sizes at intermediate effective distances can be determined in a similar manner as the focus settings. Thus, a functional approximation for the relationship between size and effective distance can be determined.

Figure 7:
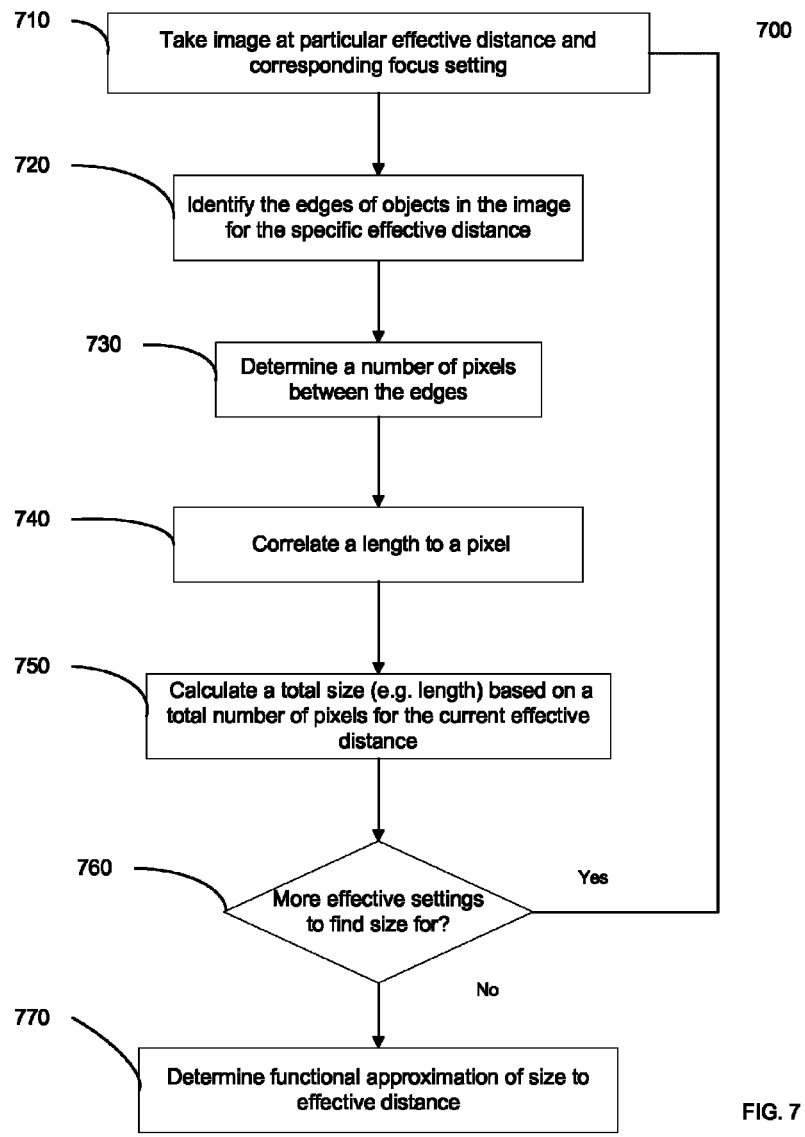
FIG. 7 is a flowchart illustrating a method mapping an effective distance to a size of a sample according to embodiments of the present invention.

FIG. 7 is a flowchart illustrating a method 700 for determining a functional approximation for the relationship between an effective distance and size of a sample according to embodiments of the present invention. Method 700 can use a calibration target with objects of known size, e.g. the distance between two features (e.g. edges) is known. For example, a test pattern comprised of a checkerboard pattern of two varying grayscale intensities is used, such as black and 40% gray (See label 1 of FIG. 8); however, other shaped objects and features may be used. Once pixels corresponding to those features are identified, the size of the image (and any image taken at the effective distance) can be determined.

In step 710, an image of the calibration target is taken at a specific effective distance (e.g. zoom position), e.g. using an optimal focus determined in method 200. An object of known size can be placed such that there is at least one object always in the image for any effective distance. Thus, the image can be analyzed to identify the object of known size. In one embodiment, the specific effective distance may be one of the initial effective distances used in method 200. In another embodiment, the specific effective distance is not one in which an optimal focus setting has been directly determined, but which is determined using a functional approximation of optimal focus setting as a function of effective distance.

Figure 8:
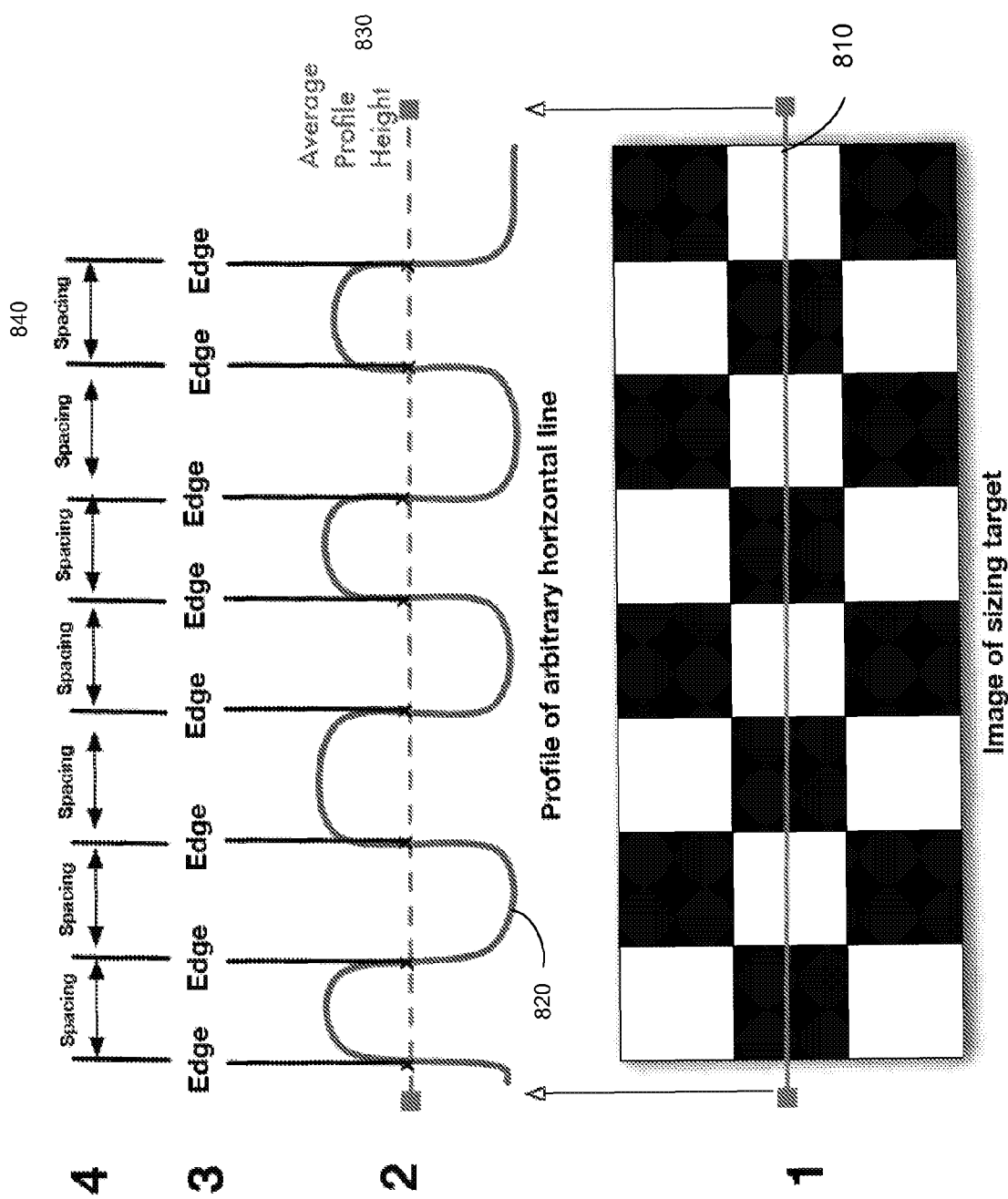
FIG. 8 provides a visualization of different aspects of method 700 according to embodiments of the present invention.

In step 720, the edges of at least one of the objects in the image are identified for the image in step 710. In FIG. 8, the edges can be the edges of a black box or a grey (whitish) box. In other embodiments, the edges of other objects or any two other features may be used. An edge may be identified as the pixel(s) where a certain change in contrast occurs. For example, a pixel can be identified where the change in pixel intensity is most abrupt. In other embodiments, the features can be the middle of the boxes. The middle can be identified as a maximum or minimum in the intensity.

To identify the edges, one embodiment creates a horizontal or vertical pixel profile (intensity values) at an arbitrary y or x-position in the image. Line 810 of FIG. 8 shows a line along which a pixel profile 820 is created. For a monochromatic calibration target, pixel profile 820 can be proportional (directly or inversely) to pixel intensity. In FIG. 8, the relationship is inverse as the highest values are where the back boxes are. In one aspect, horizontal profiles that start exactly at the middle of the image can be used. Based on the profile, an edge may be determined.

In one embodiment, a second derivative of the profile is determined. The point where the second derivative is zero (e.g. changes sign from positive to negative, or vice versa) can be identified as an edge. The second derivative can be determined using any finite difference formula. For example, the pixel where the change in intensity between the previous pixel is smaller than the change in intensity form the pixel to the next pixel.

In another embodiment, the average pixel intensity 830 of the pixel profile can be calculated and used. For example, the contrast edges can be found by checking each pixel value of the profile for one of the following criteria: (1) The pixel value left of the current pixel in the profile is smaller than the average value and the pixel value right of the current pixel in the profile is larger than the average value; (2) The pixel value left of the current pixel in the profile is larger than the average value and the pixel value right of the current pixel in the profile is smaller than the average value. In some instances, two different pixels can correspond to the edge, e.g., when no pixel has the average intensity value. In such case, the one closest to the average can be chosen, or either one can be chosen.

Referring back to FIG. 7, in step 730, a number of pixels between the edges (or other features) is determined. In one embodiment, the number of pixels between two edges may simply be counted. This number of pixels may be determined for several objects and then averaged to provide the determined number of pixels.

FIG. 8 shows the spacing 840 between neighboring edges. In one embodiment, a standard deviation of the spacing may be used to detect errors. For example, to avoid cases of invalid pixel profiles (e.g. horizontal profiles which are near a vertical edge) the standard deviation should be small (e.g. less than 2.5%). In case of an invalid pixel profile, a different pixel profile (e.g. a horizontal profile along a next adjacent y pixel position) is chosen.

In step 740, a length is correlated to a pixel. This may be done by dividing the known distance between the edges by the number of pixels determined to be between the edges, thereby providing a length per pixel. Equivalently, a number of pixels per length may also be obtained. The known distance (e.g. a distance between the features on the calibration target) may be received, e.g., by controller 130, from a memory or via input by a user. In one aspect, the distance between each object can be the same, e.g., each checkerboard box can have the length of 0.5 cm.

In step 750, a total size (e.g. length) is calculated based on a total number of pixels fro the image at the current effective distance. In one embodiment, the image area (or length) per image pixel is multiplied by the number of pixels in the x and y axes of the image sensor. The calculation can be performed by the controller 130, by another computer in the imaging system, or by an external computer.

In another embodiment, the number of entirely visible checkerboard boxes is calculated. The number of entirely visible boxes can be determined as the number of edges minus one. The size of the partly visible checkerboard at the beginning and the end of the profile may be estimated based on the number of pixels remaining The physical size (e.g. length) of the image is the sum of the entirely visible checkerboard boxes and the two partly visible checkerboard boxes.

In yet another embodiment, a calculated distance from the first/last edge to the image border may be divided by the spacing between neighboring edges, thereby providing a percentage of the box that is partly visible. For example, if the distance from the beginning to the first edge is 40 pixels and the spacing between two neighboring edges is on average 100 pixels, only 40% of the first checkerboard is visible. Since the size of the checkerboards is known, the physical size of the partly visible checkerboards can be calculated, e.g., 40% of 0.5 cm is 0.2 cm.

In yet another embodiment, the physical size of a subarea of the image (e.g., not one of the known objects) is calculated. For example, half the image width and height in the center of the image can be used. The physical size of the entire image is calculated by multiplying the size of the subarea by the number of pixels of the entire image divided by the number of pixels in the subarea. Any combination of the above embodiments may be used, as well as other methods as would be appreciated by one skilled in the art.

In step 760, it is determined whether any more effective settings need a size to be determined. If so, the method repeats steps 710-750 for these other effective distances. In one aspect, N images are acquired at N zoom positions (and associated focus settings) equally spaced along the zoom range. In some embodiments, the corresponding size (e.g. length) for each effective distance can be stored in a computer readable medium adapted to be communicably coupled with the imaging system. In one embodiment, the computer readable medium can be part of controller 130.

In step 770, a functional approximation for the relationship of size to effective distance is determined from the data points of {size, initial effective distance}. The functional approximation can be calculated in any of the ways described above for the functional approximation of focus to effective distance. Means for determining this functional approximation can also be stored on a computer readable medium in a similar fashion.

Figure 9:
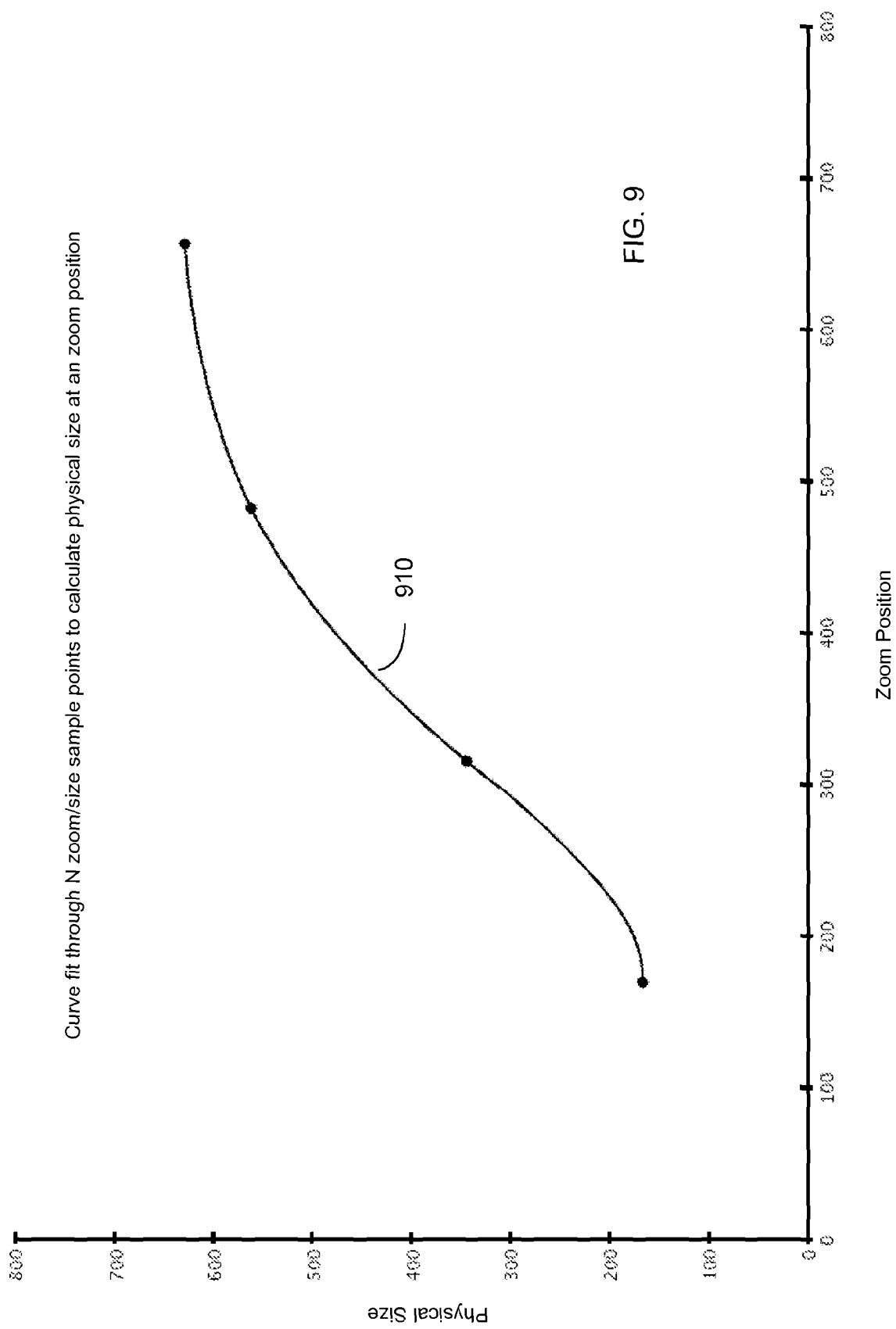
FIG. 9 shows a plot for a functional approximation describing the relationship between the zoom position of the lens and the physical size of the sample in the image acquired by the camera according to embodiments of the present invention.

FIG. 9 shows a plot for a functional approximation 910 describing the relationship between the zoom position of the lens and the physical size of the sample in the image acquired by the camera according to embodiments of the present invention. Functional approximation 910 can provide a mapping of any size to effective distance, and vice versa.

B. Using an Input Size to Determine Effective Distance and Focus Setting

The mapping of size to effective distance from method 700 may be used in conjunction with method 200 to allow the focus and effective distance to be determined based on a user input of the size of the sample. If a user knows the size of a sample, the user does need to manually estimate the appropriate size. Also, in some embodiments, the user can communicate the appropriate sample size to the imaging system. The user can input which gel is being used, and the imaging system can correlated it to a known size, which can then in turn be used to determine the effective distance and focus settings. In one embodiment, the settings for the input gel can be saved for later use.

Figure 10:
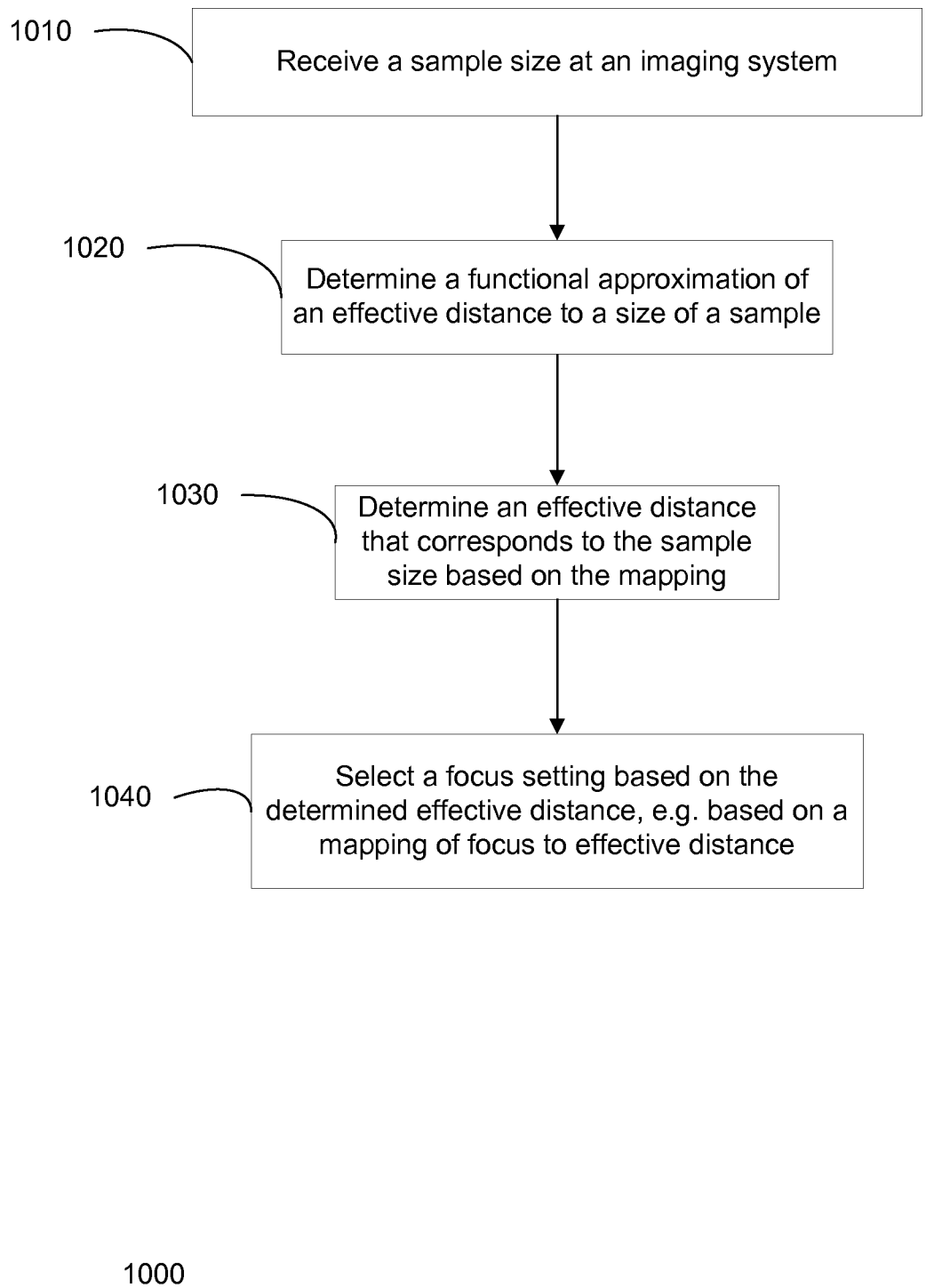
FIG. 10 is a flowchart illustrating a method for determining an effective distance and focus based on an input of a sample size according to an embodiment of the present invention.

FIG. 10 is a flowchart illustrating a method 1000 for determining an effective distance and focus based on an input of a sample size according to an embodiment of the present invention. In step 1010, a sample size is received at an imaging system (e.g. system 100). The sample size may be received from a user as a value or as an identification of the type of container in which the sample resides, which can then be cross-referenced to size. For example, the user can input the size as an area or length. The sample size can correspond to a size of the image needed to accurately analyze the sample. For instance, the user may provide an input sample size that is technically larger than the actual sample, but just enough to ensure that the entire sample is imaged. In one aspect, the input sample size may not be one of the initial effective distances, e.g., as used in method 700.

In step 1020, the imaging system determines a functional approximation of an effective distance to a size of a sample. The functional approximation can be determined in various ways as described herein, e.g., as mentioned for FIGS. 2*b* and 2C. In one embodiment, the functional approximation can be retrieved from a permanent or removable computer readable medium. In another embodiment, the functional approximation can be calculated based on a set of data points including the initial effective distances and the corresponding sizes, which may be determined as described above in method 700.

In step 1030, an effective distance that corresponds to the sample size based on the mapping is determined. This effective distance may be determined by evaluating the functional approximation for the input size. For example, curve 910 in FIG. 9 can be used to determine the zoom position as the input physical size. Such a determination can involve inputting the size into a function and receiving a zoom position. As mentioned above, the mapping may be one-one or many-one. For instance, if the functional approximation is stored as a set of finite data points (as opposed to parameters of a piece-wise continuous function), then any of the input sizes closest to a size in the data appoints can map to the same corresponding effective distance.

In step 1040, a focus setting is selected based on the determined effective distance. The focus setting may be determined based on a functional approximation of the effective distance to a focus setting, e.g., as determined via method 200. Thus, a user can simply input a sample size (as a number or as an identifier of a container of known size), and the imaging system can adjust the optical components to accurate settings.

C. Using the Mapping to Determine a Size of the Sample

Figure 11:
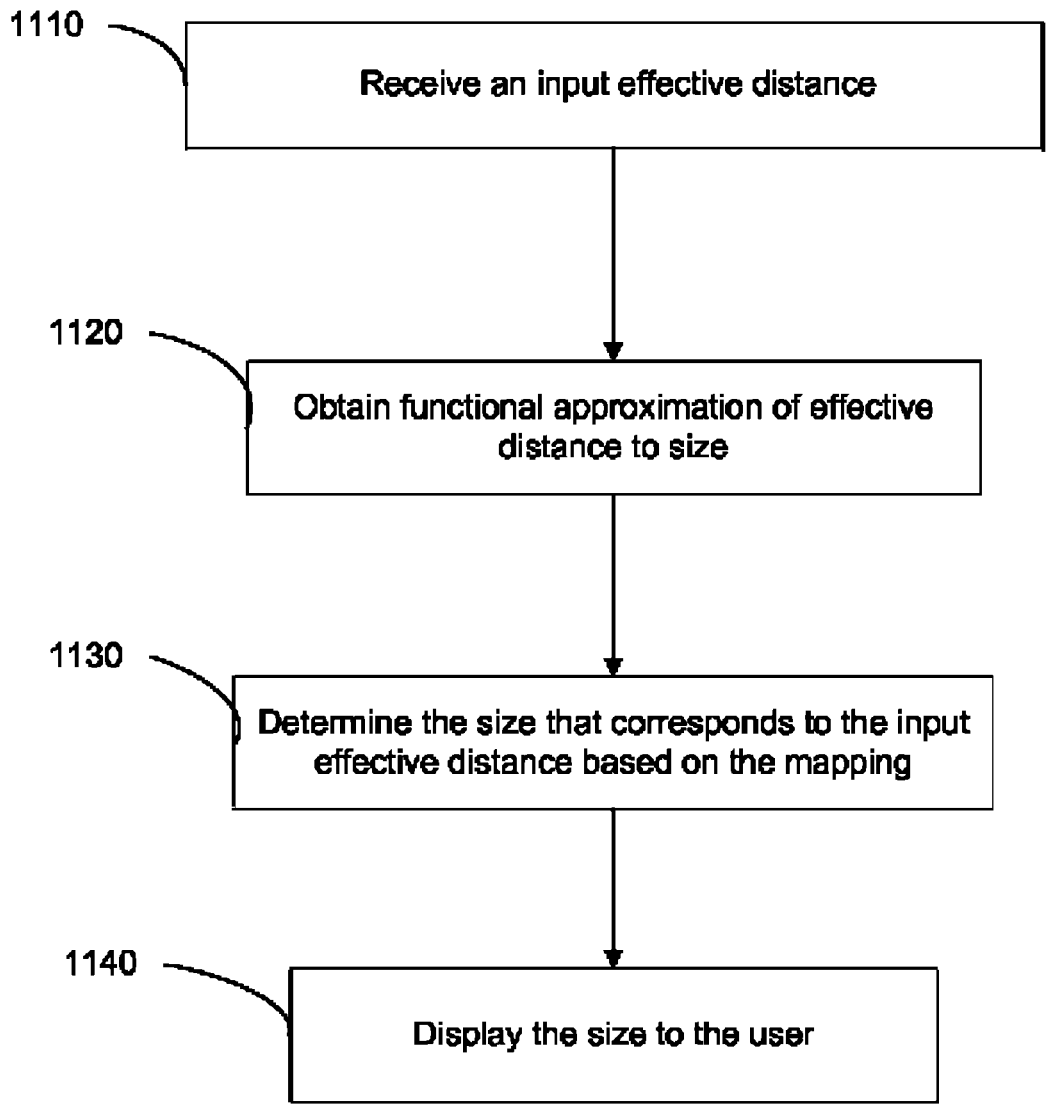
FIG. 11 is a flow chart illustrating a method of determining a size of a biological or chemical sample using an imaging system according to embodiments of the present invention.

The mapping of size to effective distance may also be used to provide a sample size (e.g. a size legend) to an end user of an imaging system. FIG. 11 is a flow chart illustrating a method 1100 of determining a size of a biological or chemical sample using an imaging system according to embodiments of the present invention.

In step 1110, an input effective distance between an optical component of the imaging system and a sample is received. For example, a user can change the zoom on a lens until the sample can be fully viewed in the image. This zoom setting can then be used as the input effective distance.

In step 1120, a functional approximation of effective distance to size is obtained. The functional approximation can be determined in any of the ways described above. For example, it can be read from a computer readable medium (e.g. a non-volatile memory) coupled with controller 130, or determined by controller 130 from initial data points read from the memory.

In step 1130, the size that corresponds to the input effective distance is determined based on the functional approximation. As mentioned above, in one embodiment, multiple sizes can correspond to the input effective distance. In other embodiments, a size may uniquely correspond to one value of the input effective distance.

In step 1140, the size is displayed to a user. For example, the imaging system may have a monitor or other display screen for showing the sample with the size marked. In one embodiment, the size may be provided as a legend that equates a size of the screen to a size of the sample. In another example, the imaging system can print the size.

IV. Flat Field Corrections

In imaging the molecules of a sample, it is desired to have uniform signal response over the whole imaging area. That is two points providing equal amounts of light should be imaged to have the same brightness. Such uniformity can provide greater accuracy in identifying and characterizing the molecules. However, lenses and illumination sources can cause certain points, typically along the edges, to not have equal brightness as other points. Certain embodiments can correct for this effect by imaging a flat-field target that has substantially uniform brightness properties and then calculating the correction factor for each pixel so that all pixels have the same brightness. U.S. Pat. No. 5,799,773 provides examples of correction factors that can be used.

A. For Samples Illuminated with a Light Source

Figure 12A:
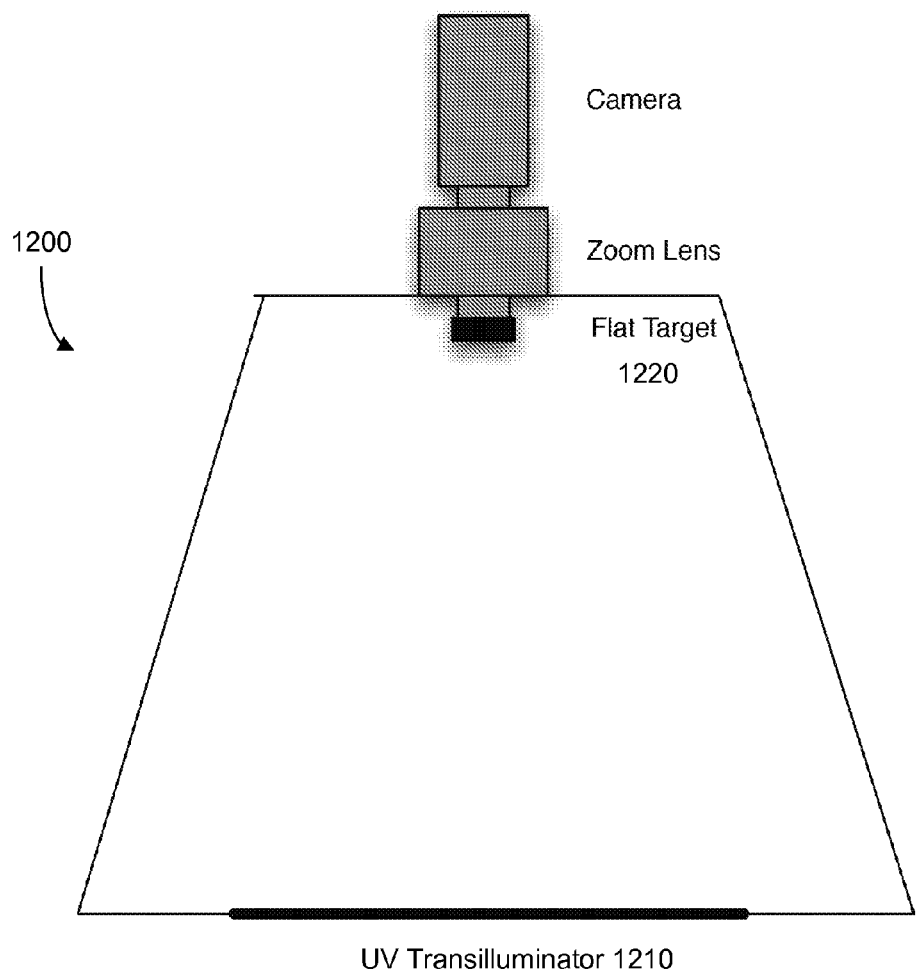
FIG. 12A shows an imaging system operable to identify flat-field corrections according to embodiments of the present invention.

FIG. 12A shows an imaging system 1200 with a flat-field target 1210 that can be used to determine a flat-field correction for a lens and light source according to embodiments of the present invention. In one embodiment, the flat-field target 1210 is a UV transilluminator that is a sheet of luminescent (e.g. fluorescent) material with substantially uniform luminescent properties when illuminated by a uniform light source. An image of the target 1210 can be taken, and then differences from uniformity can be used to correct images of samples.

The target 1210 may be positioned on the imaging platen over a light source during acquisition of a flat-field model image. Although the target may be constructed to be substantially uniform luminescent properties when illuminated by a uniform light source, the light source may not be uniform. The target 1210 can be used modeling both a given light source and lens non-uniformity as both will be captured by an image.

B. For Samples not to be Illuminated with a Light Source

FIG. 12A also shows an imaging system 1200 with a flat-field target 1220 that can be used to determine a flat-field correction of a lens according to embodiments of the present invention. In one embodiment, the flat field target 1220 for modeling only lens non-uniformity is a sheet of luminescent (e.g. fluorescent) material with substantially uniform luminescent properties. This target can be placed in close proximity to the zoom lens, well inside the minimal operating distance of the lens focal range, when acquiring a flat field model image.

Figure 12B:
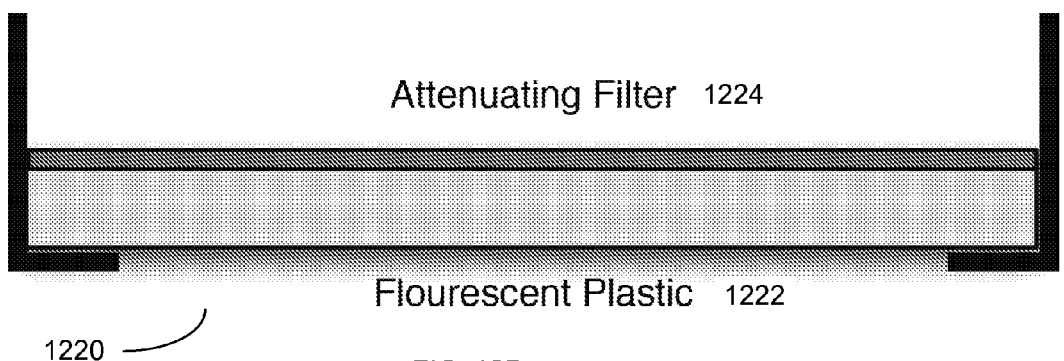
FIG. 12B shows an example of a target 1220 for determining a flat-field correction of a lens according to embodiments of the present invention.

FIG. 12B shows an example of a target 1220 for determining a flat-field correction of a lens according to embodiments of the present invention. A fluorescent piece of plastic 1222 with a filter 1224 to attenuate the light may be attached to the front of the glass of the lens. The fluorescent plastic 1222 is illuminated from below with ultraviolet light. As the fluorescent plastic 1222 is relatively far from the light source, the non-uniformities in the light source may be minimal.

In one embodiment, the target 1220 is a cap that fits over or onto the lens. In another embodiment, the target is supported by another device or hangs off the lens. The target 1220 can be close to the lens so as to better approximate non-uniformities in the lens. In one implementation, the target is close enough so that the field of the lens is filled with the light from the target, and the target is out of focus. For example, a focus of the lens can be set on the light source, and an image of the luminescence target is created at the set focus. A flat field correction can then be calculated for the created image.

C. Flat Field Calibration for Multi-Zoom System

Figure 13:
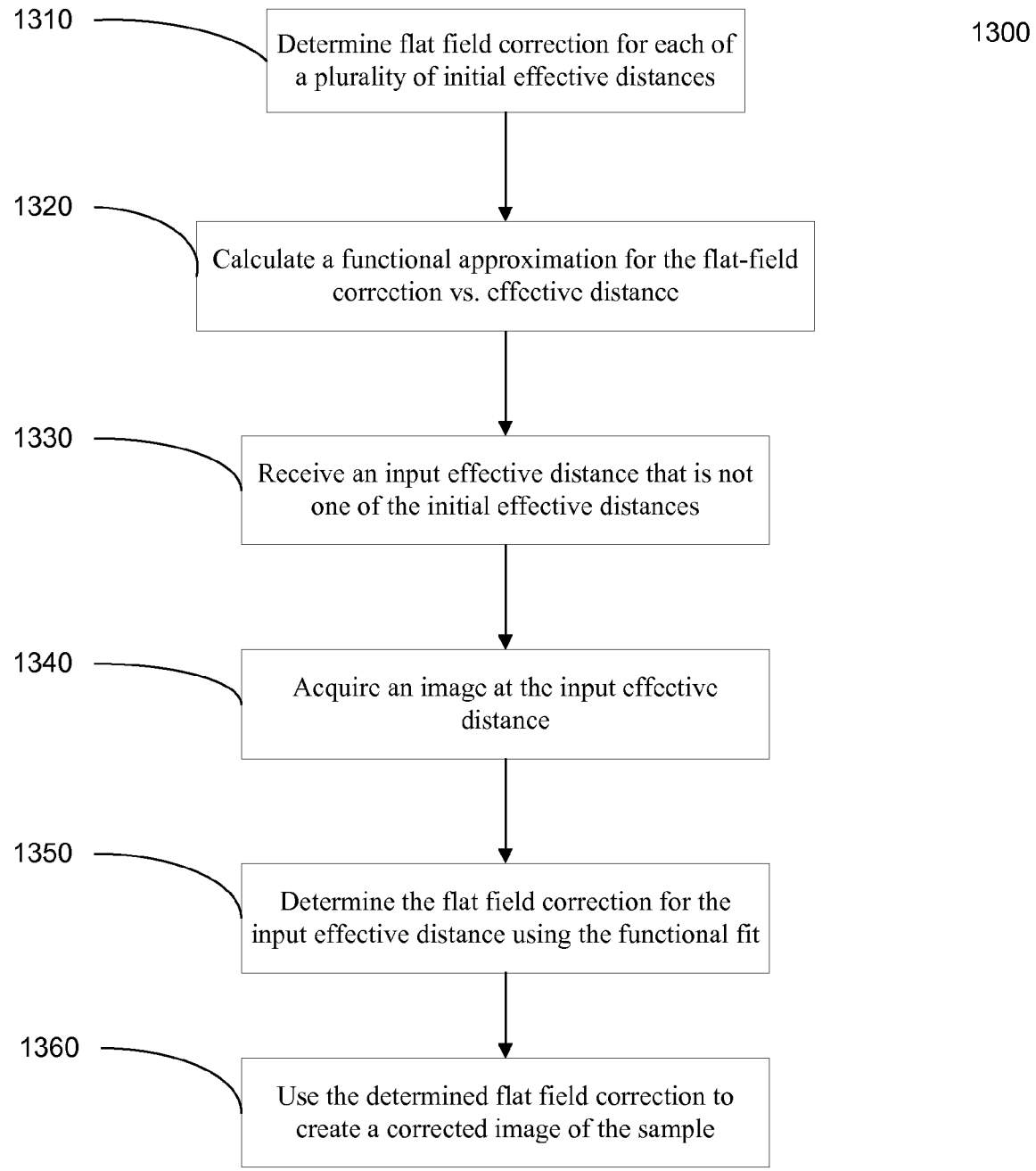
FIG. 13 is a flowchart illustrating a method of performing a flat-field correction for an imaging system for imaging biological or chemical samples according to embodiments of the present invention

FIG. 13 is a flowchart illustrating a method 1300 for performing a flat field correction of an imaging system for imaging biological or chemical samples according to an embodiment of the present invention. Method 1300 can acquire a flat-field model image at each of the initial zoom positions using the corresponding optimal focus settings. However, other zoom settings with optimal focus settings determined from an functional approximation (e.g. as described above) may be used. Method 1300 may be performed independently for corrections to sample images that are obtained with a light source and to sample images that to be obtained not using a light source. Flat field model images at intermediate zoom values may be determined from a functional approximation of zoom setting vs. flat-field correction, e.g., a pixel value interpolation between the flat field model images of the two closest zoom positions. Thus, the flat-field correction may be obtained for any effective distance.

In step 1310, a flat field correction is determined for each of a plurality of initial effective distances from an optical component of the imaging system to a sample. For example, a flat-field correction can be determined at each of N zoom positions, which may be equally spaced along the zoom range. In embodiments where target 1210 is used, the target 1210 may be placed in the sample location and thus it should be in focus for a particular effective distance when the corresponding optimal focus position is used. In embodiments where target 1220 is used, the light source can be place at the sample location.

In one embodiment, the flat-field correction includes a value at each pixel of the image. The correction can be calculated as a multiplication value needed to ensure a uniform image. For example, if the average intensity is M, then the correction for a pixel can be determined as M divided by the intensity at that pixel for the flat-field image. In this manner, pixels that are too bright (i.e. brighter than average) are multiplied by a number less than one, and pixels that are less bright are multiplied by a number greater than one.

In step 1320, a functional approximation for the relationship between the flat-field correction and corresponding effective distances is calculated. In one embodiment, the functional approximation is performed independently for each pixel. For example, a separate functional approximation is performed for each pixel using the values of the flat-field corrections from 1310 for that pixel. Each functional approximation may be computed via any of the methods described herein, e.g., using means stored on a computer readable medium.

In step 1330, an input effective distance that is not one of the initial effective distances is received. In one embodiment, the input effective distance is received from the user. In another embodiment, the input effective distance is determined from an input of sample size, e.g. as may be done via method 1000.

In step 1340, an image is acquired at the input effective distance. In one embodiment, the image is acquired using an optimal focus for the input effective distance as determined using method 200. The image can consist of a set of pixel values, each of which may be corrected with the flat-field correction.

In step 1350, the flat-field correction for the input effective distance is determined using the functional approximation. For example, the input effective distance may be input into a function, which provides the corresponding flat-field correction for each pixel of the image. In one embodiment, a specific flat-field is synthetically created at an input zoom setting by interpolation between the two appropriate flat field images acquired in 1310. Thus, the flat-field corrections for each pixel may be determined for any zoom setting.

In step 1360, the determined flat field correction is used to create a corrected image of the sample. For example, each pixel of the acquired image may be multiplied by the corresponding flat-field correction for the input effective distance. In one embodiment, controller 130 may be used to determine the corrected image.

Figure 14:
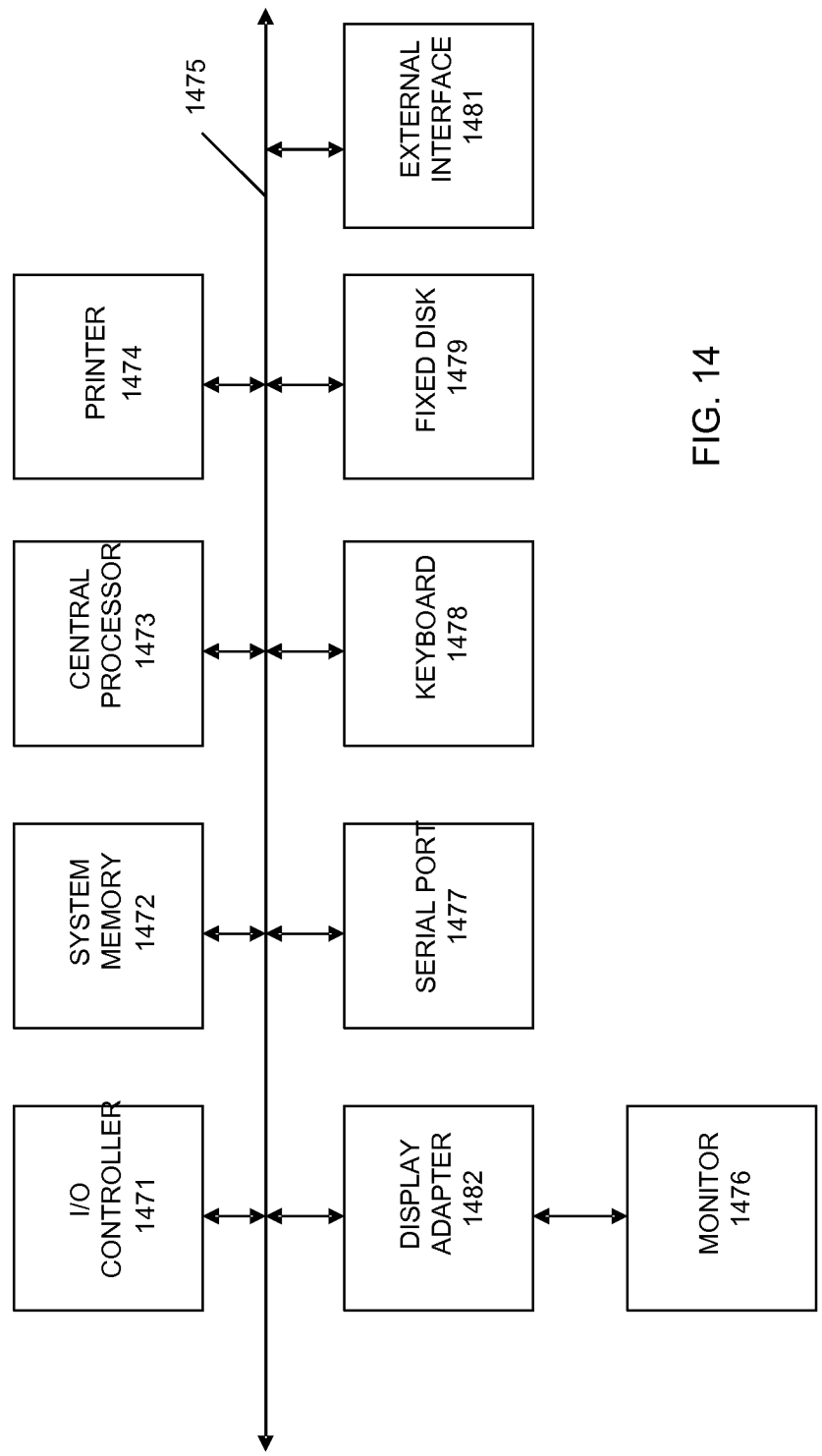
FIG. 14 shows a block diagram of an exemplary computer apparatus usable with system and methods according to embodiments of the present invention.

FIG. 14 shows a block diagram of an exemplary computer apparatus 1400 usable with system and methods according to embodiments of the present invention. The computer apparatus may utilize any suitable number of subsystems. Examples of such subsystems or components are shown in FIG. 14. The subsystems shown in FIG. 14 are interconnected via a system bus 1475. Additional subsystems such as a printer 1474, keyboard 1478, fixed disk 1479, monitor 1476, which is coupled to display adapter 1482, and others are shown. Peripherals and input/output (I/O) devices, which couple to I/O controller 1471, can be connected to the computer system by any number of means known in the art, such as serial port 1477. For example, serial port 1477 or external interface 1481 can be used to connect the computer apparatus to a wide area network such as the Internet, a mouse input device, or a scanner. The interconnection via system bus allows the central processor 1473 to communicate with each subsystem and to control the execution of instructions from system memory 1472 or the fixed disk 1479, as well as the exchange of information between subsystems. The system memory 1472 and/or the fixed disk 1479 may embody a computer readable medium.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

It should be understood that the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or digital versatile disk (DVD), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for calibrating an imaging system for imaging biological or chemical samples, the method comprising:

for each of a plurality of initial effective distances from an optical component of the imaging system to a calibration target at a sample location, identifying an initial optimal focus setting of the optical component, wherein different initial effective distances correspond to different initial optimal focus settings of the optical component; and storing data for the imaging system to determine a first functional approximation that is derived from the initial optimal focus settings of the optical component for the initial effective distances, the data being stored in at least one non-transitory computer readable medium that is adapted to be communicably coupled with the imaging system, wherein the first functional approximation is operable for calculating a new optimal focus setting of the optical component for a new effective distance having a different numerical value that is not a numerical value of one of the initial effective distances, the new effective distance being from a biological or chemical sample to the optical component, the biological or chemical sample not being the calibration target, and wherein the only value input to the first function approximation for calculating the new optimal focus setting of the optical component is the numerical value of the new effective distance;

determining a flat-field correction for each of the initial effective distances; and storing data for the imaging system to determine a second functional approximation that is derived from the flat-field corrections at the initial effective distances, the data being stored in the at least one non-transitory computer readable medium that is adapted to be communicably coupled with the imaging system, wherein the second functional approximation is operable for calculating a flat-field correction for a new effective distance that is not one of the initial effective distances, the new effective distance being from a biological or chemical sample to the optical component.

2. The method of claim 1, further comprising:
the imaging system receiving the new effective distance that is not one of the initial effective distances;
the imaging system determining the first functional approximation using the data stored in the at least one non-transitory computer readable medium; and
the imaging system calculating a new optimal focus setting for the new effective distance using the first functional approximation.

3. The method of claim 1, wherein the data for determining the first functional approximation includes a formula defining the first functional approximation and program code for retrieving the formula.

4. The method of claim 1, wherein the data for determining the first functional approximation includes the initial optimal focus settings for each initial effective distance and program code for calculating the first functional approximation.

5. The method of claim 1, wherein the effective distance settings are zoom settings for the optical component, and wherein the optical component is a lens.

6. The method of claim 1, wherein the calibration target has a higher contrast than the biological or chemical samples.

7. The method of claim 6, wherein identifying an initial optimal focus setting of the optical component is performed by the imaging system.

8. The method of claim 1, further comprising:
using the first functional approximation to determine an offset functional approximation that is to be used when a biological or chemical sample is offset from the sample location; and
storing data for the imaging system to determine the offset functional approximation, the data being stored in the at least one non-transitory computer readable medium that is adapted to be communicably coupled with the imaging system.

9. The method of claim 8, further comprising:
for the offset of the smallest initial effective distance, identifying an optimal focus setting of the optical component; and
determining the change in the optimal focus setting at the smallest initial effective distance and the offset smallest initial effective distance, and
wherein using the first functional approximation to determine the offset functional approximation includes shifting each optimal focus setting for each initial focus setting by respective amounts proportional to the change.

10. The method of claim 1, further comprising:
the imaging system determining the second functional approximation using the data stored in the at least one non-transitory computer readable medium; and
the imaging system calculating a flat-field correction for the new effective distance using the second functional approximation; and
using the flat-field correction to create a corrected image of the sample.

11. The method of claim 10, wherein the second functional approximation includes a separate function for each pixel of the corrected image.

12. The method of claim 1, further comprising:
receiving an input effective distance that is not one of the initial effective distances, wherein the biological or chemical sample fills at least a specified portion of the image when the input effective distance is used;
the imaging system obtaining a mapping of any input value of effective distance to an output corresponding size, wherein the mapping is provided by a function that approximates a dependence of size on effective distance; and
the imaging system determining the size of the biological or chemical sample that corresponds to the input effective distance based on the mapping.

13. The method of claim 12, further comprising;
the imaging system providing the size to a user.

14. The method of claim 12, wherein the mapping of effective distance to size is determined using a calibration target, and wherein the calibration target includes at least one object of known size, the method further comprising:
for each of a plurality of images acquired at a plurality of initial effective distances, using an identified initial optimal focus setting of the optical component to determine a correlation of the known size to a number of pixels;
based on the correlation of the known size to a number of pixels, determining a size of the image; and
storing data for the imaging system to determine a functional approximation that is derived from the sizes at the initial effective distances, the data being stored in the at least one non-transitory computer readable medium that is adapted to be communicably coupled with the imaging system, wherein the functional approximation is operable for calculating a size for a new effective distance that is not one of the initial effective distances.

15. The method of claim 12, wherein the mapping is obtained by retrieving a plurality of initial effective distances and corresponding sizes for each initial effective distance;
using the initial effective distances and corresponding sizes to determine the function that approximates the dependence of size on effective distance.

16. The method of claim 15, wherein the function is determined using an interpolation between the effective distances proximal to the input effective distance.

17. The method of claim 12, wherein the input effective distance is the only input value received for determining the size of the biological or chemical sample.

18. A method for calibrating an imaging system for imaging biological or chemical samples, the method comprising:
for each of a plurality of initial effective distances from an optical component of the imaging system to a calibration target at a sample location, identifying an initial optimal focus setting of the optical component, wherein different initial effective distances correspond to different initial optimal focus settings of the optical component; and
storing data for the imaging system to determine a first functional approximation that is derived from the initial optimal focus settings of the optical component for the initial effective distances, the data being stored in at least one non-transitory computer readable medium that is adapted to be communicably coupled with the imaging system,
wherein the first functional approximation is operable for calculating a new optimal focus setting of the optical component for a new effective distance having a different numerical value that is not a numerical value of one of the initial effective distances, the new effective distance being from a biological or chemical sample to the optical component, the biological or chemical sample not being the calibration target, and
wherein the calibration target has a higher contrast than the biological or chemical samples, and wherein the calibration target includes at least one object of known size;
for each of a plurality of images acquired at the initial effective distances:
using the identified initial optimal focus setting of the optical component to determine a correlation of the known size to a number of pixels; and
based on the correlation of the known size to a number of pixels, determining a size of the image; and
storing data for the imaging system to determine a second functional approximation that is derived from the sizes at the initial effective distances, the data being stored in the at least one non-transitory computer readable medium that is adapted to be communicably coupled with the imaging system, wherein the second functional approximation is operable for calculating a new effective distance that is not one of the initial effective distances from a size.

19. The method of claim 18, further comprising:
the imaging system receiving a sample size from a user;
the imaging system determining the second functional approximation using the data stored in the at least one non-transitory computer readable medium;
determining an effective distance that corresponds to the sample size based on the second functional approximation; and
using the first functional approximation to select a focus setting based on the determined effective distance.

20. The method of claim 19, wherein the effective distance and optimal focus setting are automatically adjusted, by the imaging system, to be the determined effective distance and the selected focus setting.

21. The method of claim 18, wherein determining a correlation of the known size to a number of pixels includes:
for each of the plurality of images acquired at the initial effective distances:
determining a distance between two features of the at least one object of known size;
identifying the two features in the image;
identifying a number of pixels between the features; and
correlating a size to a pixel using the known size and the number of pixels.

22. An imaging system for imaging biological or chemical samples, the imaging system comprising:
an optical component having a plurality of focus settings;
a zoom lens for changing a value of a new effective distance from the optical component to a biological or chemical sample;
at least one non-transitory computer readable medium that stores:
first data for the imaging system to determine a first functional approximation that is derived from initial optimal focus settings of the optical component for a plurality of initial effective distances from the optical component of the imaging system to a calibration target at a sample location, and
second data for the imaging system to determine a second functional approximation that is derived from flat-field corrections at the initial effective distances, wherein the second functional approximation is operable for calculating a flat-field correction for a new effective distance that is not one of the initial effective distances;
one or more processors configured to map any value of effective distance to an optimal focus setting by:
determining the first functional approximation from the first data stored in the at least one non-transitory computer readable medium, and
inputting a selected effective distance into the first functional approximation to obtain the optimal focus setting, wherein the effective distance is a zoom setting, wherein the selected effective distance is not one of a plurality of initial effective distances; and
a controller configured to set the optical component to have the optimal focus setting that maps to the selected effective distance, wherein the one or more processors are further configured to:
  determine the second functional approximation from the second data stored in the at least one non-transitory computer readable medium; and
  inputting the selected effective distance into the second functional approximation to calculate the flat-field correction; and
using the flat-field correction to create a corrected image of the sample.

23. The imaging system of claim 22, further comprising:
an interface for receiving the selected effective distance from a user.

24. The imaging system of claim 22, further comprising:
an interface for receiving a sample size from a user, wherein the one or more processors are further configured to map any sample size to an effective distance, the sample size corresponding to the selected effective distance, and
wherein the means for changing the effective distance is adapted to change the effective distance to the selected effective distance based on the mapping of the one or more processors.

25. The imaging system of claim 22, wherein the one or more processors determine the first functional approximation by reading the initial optimal focus settings for each of a plurality of initial effective distances and calculating the first functional approximation.

26. The imaging system of claim 25, wherein the controller is configured to set the optical component to have a new optimal focus setting for a new effective distance that is not one of the selected effective distances by interpolating between optimal focus settings corresponding to initial effective distances proximal to the new effective distance.

27. The imaging system of claim 22, the one or more processors are further configured to map any input sample size to an effective distance, and then map the effective distance to an optimal focus setting.

28. The method of claim 1, wherein the focus setting defines a position of a focusing lens within a camera.

29. The imaging system of claim 22, wherein the second functional approximation includes a separate function for each pixel of the corrected image.

* * * * *